(12) United States Patent
McKeever et al.

(10) Patent No.: US 11,004,310 B2
(45) Date of Patent: May 11, 2021

(54) HORSE RACE BETTING GRAPHICAL USER INTERFACE

(71) Applicant: EquinEdge, LLC, Newport Beach, CA (US)

(72) Inventors: Scott McKeever, Corona, CA (US); Wei-Che Tseng, Corona, CA (US); Michael Maiorana, Corona, CA (US)

(73) Assignee: EquinEdge, LLC, Newport Beach, CA (US)

( * ) Notice: Subject to any disclaimer, the term of this patent is extended or adjusted under 35 U.S.C. 154(b) by 0 days.

(21) Appl. No.: 16/540,357

(22) Filed: Aug. 14, 2019

(65) Prior Publication Data

US 2020/0105107 A1 Apr. 2, 2020

Related U.S. Application Data

(60) Provisional application No. 62/739,678, filed on Oct. 1, 2018.

(51) Int. Cl.
*G07F 17/32* (2006.01)
*G06Q 50/34* (2012.01)
*G06F 3/0482* (2013.01)

(52) U.S. Cl.
CPC ........ *G07F 17/3288* (2013.01); *G06F 3/0482* (2013.01); *G06Q 50/34* (2013.01); *G07F 17/323* (2013.01); *G07F 17/3209* (2013.01); *G07F 17/3211* (2013.01); *G07F 17/3244* (2013.01)

(58) Field of Classification Search
CPC ............. G07F 17/3288; G07F 17/3209; G07F 17/3211; G07F 17/323; G07F 17/3244; G06F 3/0482; G06Q 50/34
See application file for complete search history.

(56) References Cited

U.S. PATENT DOCUMENTS

| | | | |
|---|---|---|---|
| 2002/0065120 A1 | 5/2002 | Lee et al. | |
| 2003/0144046 A1 | 7/2003 | Hara | |
| 2010/0331066 A1 | 12/2010 | Jung et al. | |
| 2015/0213684 A1* | 7/2015 | Daruty | G07F 17/326 463/6 |
| 2015/0279164 A1 | 10/2015 | Miller et al. | |

OTHER PUBLICATIONS

International Search Report for PCT/US2019/053984; dated Dec. 5, 2019.

* cited by examiner

*Primary Examiner* — William H McCulloch, Jr.
*Assistant Examiner* — Ankit B Doshi
(74) *Attorney, Agent, or Firm* — Stetina Brunda Garred & Brucker

(57) ABSTRACT

A method of generating a graphical user interface for horse race betting includes displaying a first list of horses scheduled to run a first race from among a plurality of horses, displaying, in association with each horse of the first list of horses, a win selection element by which a user of the graphical user interface may mark the horse as selected to win the first race, displaying an automatic ticket generation button by which a user may request an automatic selection of horses, and, in response to a user interaction with the automatic ticket generation button, marking one or more horses of the first list of horses as selected to win the first race based on predicted win percentages of the horses of the first list. The method may include displaying, in association with each horse of the first list of horses, the predicted win percentage of the horse.

25 Claims, 16 Drawing Sheets

| | | | | | | | |
|---|---|---|---|---|---|---|---|
| UPCOMING RACES | Ajax Downs R1 • 45m | Lousiana Downs R1 • 49m | Los Alamitos R1 • 50m | Los Alamitos R1 • 50m | Los Alamitos R1 • 50m | Los Alamitos R1 • 50m | Los Alamitos R1 • 50m |

Manage Stable    John Doe — 541

520

522 — Select Date ◄
524 — Select Track
- Albuquerque
- Arlington Park
- Belterra Park
- Black Foot
- Canterbury Park
- Century Downs
- Columbus
- Del mar
- Elko Fair
- Ellis Park
- Emerald Downs
- Fort Erie
- Golden Gate Fields
- Gulfstream Park
- Lethbridge
- Los Alamitos
- Louisiana Downs 526 — Race

| Racing Today | Racing Tomorrow | | | |
|---|---|---|---|---|
| 6 | 3 | | 35 | 205 |

HORSES RUNNING TODAY. 11/09/18

| | | | | |
|---|---|---|---|---|
| | | Entered Horses | Horses Following — 1222 | Trainers |
| Hehasspirit | Ajax Downs-R1 | View Race | Follow past this race | Notes: Had trouble — 1224 |
| StabledHorse2 | Lousiana Downs - R4 | View Race | 👍 | Notes: Got bumped |
| StabledHorse3 | Los Alamitos - R7 | View Race | | |
| StabledHorse4 | Los Alamitos - R1 | View Race | Follow past this race | Notes:Doesn't like turf |
| StabledHorse5 | Ajax Downs - R3 | View Race | 👍 | Notes:Blocked |
| StabledHorse6 | Del Mar - R1 | View Race | 👍 | |

ⓘ Reminder, these horses will be removed midnight Pacific. Please click 'Follow past this race' to keep a horse in your stable.

| | UPCOMING RACES | Ajax Downs R1 • 45m | Lousiana Downs R1 • 49m | Los Alamitos R1 • 50m | Los Alamitos R1 • 50m | Los Alamitos R1 • 50m | Los Alamitos R1 • 50m | Los Alamitos R1 • 50m | Los Alamitos R1 • 50m | Manage Stable | John Doe |

522 — Select Date ◄
524 — Select Track

- Albuquerque
- Arlington Park
- Belterra Park
- Black Foot
- Canterbury Park
- Century Downs
- Columbus
- Del mar
- Elko Fair
- Ellis Park
- Emerald Downs
- Fort Erie
- Golden Gate Fields
- Gulfstream Park
- Lethbridge
- Los Alamitos
- Louisiana Downs

526 — Race

541

| Racing Today | Racing Tomorrow. 11/10/18 | Entered Horses | Horses Following | Trainers |
|---|---|---|---|---|
| 6 | 3 | 35 | 205 | 3 |

HORSES RUNNING Tomorrow. 11/10/18

| Name ▼ | | DATE / RACE ▼ |
|---|---|---|
| StabledHorse7 | View Race | 11/09/18 Ajax Downs |
| StabledHorse8 | View Race | 11/09/18 Ajax Downs |
| StabledHorse9 | View Race | 11/09/18 Ajax Downs |

SCOTTY'S STABLE — Manage Stable — John Doe

Upcoming Races: Ajax Downs R1·45m | Lousiana Downs R1·49m | Los Alamitos R1·50m | Los Alamitos R1·50m | Los Alamitos R1·50m | Los Alamitos R1·50m | Los Alamitos R1·50m | Los Alamitos R1·50m

| | Racing Today | Racing Tomorrow | Entered Horses | Horses Following | | Search a Trainer | |
|---|---|---|---|---|---|---|---|
| | 6 | 3 | 35 | 205 | | 3 | |
| Remove | Horse ▼ | | Trainer ▼ | DATE ADDED ▼ | | Trainers | DATE LAST RACED ▼ |
| ✕ | StabledHorse1 | | TrainerName1 | 11/11/18 | | | 11/11/18 |
| ✕ | StabledHorse2 | | TrainerName2 | 12/13/18 | | | 12/13/18 |
| ✕ | StabledHorse3 | | TrainerName3 | 12/30/18 | | | 12/30/18 |
| | ... | | ... | ... | | | ... |

522 Select Date
524 Select Track
- Albuquerque
- Arlington Park
- Belterra Park
- Black Foot
- Canterbury Park
- Century Downs
- Columbus
- Del mar
- Elko Fair
- Ellis Park
- Emerald Downs
- Fort Erie
- Golden Gate Fields
- Gulfstream Park
- Lethbridge
- Los Alamitos
- Louisiana Downs

526 Race

SCOTTY'S STABLE

[ Back to Eliminator ]

TrainerName1   09/12/18
3 Horses Running Today

| TRACK ▶ | RACE# ▶ | | TIME OF RACE ▶ |
|---|---|---|---|
| 1  Ajax Downs | 2 | View Race | 12:05 PM CST |
| 2  Louisiana Downs | 4 | View Race | 01:30 PM CST |
| 3  Del Mar | 6 | View Race | 02:14 PM CST |

UPCOMING RACES | Ajax Downs R1 • 45m | Lousiana Downs R1 • 49m | Los Alamitos R1 • 50m | Los Alamitos R1 • 50m | Los Alamitos R1 • 50m | Los Alamitos R1 • 50m | Los Alamitos R1 • 50m | Los Alamitos R1 • 50m

[ Manage Stable ]   John Doe

TrainerName1

Select Date ▲
Select Track
Albuquerque
Arlington Park
Belterra Park
Black Foot
Canterbury Park
Century Downs
Columbus
Del mar
Elko Fair
Ellis Park
Emerald Downs
Fort Erie
Golden Gate Fields
Gulfstream Park
Lethbridge
Los Alamitos
Louisiana Downs

Race

HORSE RACE BETTING GRAPHICAL USER INTERFACE

CROSS-REFERENCE TO RELATED APPLICATIONS

The present application claims priority to U.S. Provisional Patent Application Ser. No. 62/739,678 entitled Horse Race Betting Graphical User Interface filed Oct. 1, 2018, the disclosure of which is incorporated herein by reference.

STATEMENT RE: FEDERALLY SPONSORED RESEARCH/DEVELOPMENT

Not Applicable

BACKGROUND

1. Technical Field

The present disclosure relates generally to pari-mutuel horse race betting and, more particularly, to a user interface for generating a ticket for horse race betting.

2. Related Art

When betting on a horse race, a bettor typically tries to digest a large amount of information related to the horses running the race, some of which may be continually updated (e.g. on a tote board) as other bettors place bets. In the case of more exotic bets such as daily double or pick 3, 4, 5, 6, the bettor's decision-making process may become even more complex as he or she simultaneously considers multiple consecutive or non-consecutive races. In view of the difficulty of making well-informed bets in one's head or with pencil and paper, various computer-implemented betting tools exist in the marketplace. For example, Daily Racing Form LLC provides an online web application called DRF Bets™ TicketMaker™, available at www.drfticketmaker.com, which allows a user to construct a ticket for placing various types of bets. However, while such conventional betting tools may display published information such as morning line (M/L) odds to assist the user in choosing horses, they do not provide any real advantage to the user beyond convenience.

BRIEF SUMMARY

The present disclosure contemplates various systems, methods, and apparatuses for overcoming the above drawbacks accompanying the related art. One aspect of the embodiments of the present disclosure is a non-transitory program storage medium on which are stored instructions executable by a processor or programmable circuit to perform operations for generating a graphical user interface for horse race betting. The operations include displaying a first list of horses scheduled to run a first race from among a plurality of horses, displaying, in association with each horse of the first list of horses, a win selection element by which a user of the graphical user interface may mark the horse as selected to win the first race, displaying an automatic ticket generation button by which a user may request an automatic selection of horses, and, in response to a user interaction with the automatic ticket generation button, marking one or more horses of the first list of horses as selected to win the first race based on predicted win percentages of the horses of the first list.

The operations may include displaying, in association with each horse of the first list of horses, the predicted win percentage of the horse.

The operations may include displaying, adjacent to the first list of horses, a second list of horses scheduled to run a second race, displaying, in association with each horse of the second list of horses, a win selection element by which a user of the graphical user interface may mark the horse as selected to win the second race, displaying, adjacent to the second list of horses, a third list of horses scheduled to run a third race, displaying, in association with each horse of the third list of horses, a win selection element by which a user of the graphical user interface may mark the horse as selected to win the third race, and, in response to the user interaction with the automatic ticket generation button, further marking one or more horses of the second list of horses as selected to win the second race based on predicted win percentages of the horses of the second list and marking one or more horses of the third list of horses as selected to win the third race based on predicted win percentages of the horses of the third list.

The operations may include displaying, in association with each horse of the first, second, and third lists of horses, the predicted win percentage of the horse.

The operations may include displaying, in association with each horse of the first, second, and third lists of horses, a horse lock element by which a user of the graphical user interface may lock the horse's marked/unmarked status. The marking of one or more horses in response to a user interaction with the automatic ticket generation button may further be based on constraints imposed by a user interaction with the horse lock elements.

The operations may include displaying, in association with the first list of horses, a first leg lock element by which a user of the graphical user interface may lock marked/unmarked status of all horses of the first list of horses, displaying, in association with the second list of horses, a second leg lock element by which a user of the graphical user interface may lock marked/unmarked status of all horses of the second list of horses, and displaying, in association with the third list of horses, a third leg lock element by which a user of the graphical user interface may lock marked/unmarked status of all horses of the third list of horses. The marking of one or more horses in response to a user interaction with the automatic ticket generation button may further be based on constraints imposed by a user interaction with the first, second, and third leg lock elements.

The operations may include displaying a predicted ticket win percentage based on the predicted win percentages of horses marked to win the first, second, and third races, the predicted ticket win percentage being a likelihood that a horse from among the horses marked to win the first race will win the first race, a horse from among the horses marked to win the second race will win the second race, and a horse from among the horses marked to win the third race will win the third race.

The marking of one or more horses in response to a user interaction with the automatic ticket generation button may further be based on constraints imposed by a bet amount and a maximum ticket price. The operations may include displaying a maximum ticket price selector by which a user of the graphical user interface may select the maximum ticket price. The one or more horses marked in response to a user interaction with the automatic ticket generation button may maximize a function of a predicted ticket win percentage without causing a number of bets times the bet amount to exceed the maximum ticket price, the predicted ticket win percentage being a likelihood that a horse from among the horses marked to win the first race will win the first race, a horse from among the horses marked to win the second race will win the second race, and a horse from among the horses marked to win the third race will win the third race. The one or more horses marked in response to a user interaction with the automatic ticket generation button may maximize the predicted ticket win percentage without causing a number of bets times the bet amount to exceed the maximum ticket price.

The operations may include displaying, adjacent to the third list of horses, a fourth list of horses scheduled to run a fourth race, displaying, in association with each horse of the fourth list of horses, a win selection element by which a user of the graphical user interface may mark the horse as selected to win the fourth race, and, in response to a user interaction with the automatic ticket generation button, further marking one or more horses of the fourth list of horses as selected to win the fourth race based on predicted win percentages of the horses of the fourth list. The operations may include displaying a predicted ticket win percentage based on the predicted win percentages of horses marked to win the first, second, third, and fourth races, the predicted ticket win percentage being a likelihood that any of the horses marked to win the first race will win the first race, any of the horses marked to win the second race will win the second race, any of the horses marked to win the third race will win the third race, and any of the horses marked to win the fourth race will win the fourth race.

The operations may include displaying, adjacent to the fourth list of horses, a fifth list of horses scheduled to run a fifth race, displaying, in association with each horse of the fifth list of horses, a win selection element by which a user of the graphical user interface may mark the horse as selected to win the fifth race, and, in response to a user interaction with the automatic ticket generation button, further marking one or more horses of the fifth list of horses as selected to win the fifth race based on predicted win percentages of the horses of the fifth list. The operations may include displaying a predicted ticket win percentage based on the predicted win percentages of horses marked to win the first, second, third, fourth, and fifth races, the predicted ticket win percentage being a likelihood that any of the horses marked to win the first race will win the first race, any of the horses marked to win the second race will win the second race, any of the horses marked to win the third race will win the third race, any of the horses marked to win the fourth race will win the fourth race, and any of the horses marked to win the fifth race will win the fifth race.

The operations may include displaying, adjacent to the fifth list of horses, a sixth list of horses scheduled to run a sixth race, displaying, in association with each horse of the sixth list of horses, a win selection element by which a user of the graphical user interface may mark the horse as selected to win the sixth race, and, in response to a user interaction with the automatic ticket generation button, further marking one or more horses of the sixth list of horses as selected to win the sixth race based on predicted win percentages of the horses of the sixth list. The operations may include displaying a predicted ticket win percentage based on the predicted win percentages of horses marked to win the first, second, third, fourth, fifth, and sixth races, the predicted ticket win percentage being a likelihood that any of the horses marked to win the first race will win the first race, any of the horses marked to win the second race will win the second race, any of the horses marked to win the third race will win the third race, any of the horses marked to win the fourth race will win the fourth race, any of the horses marked to win the fifth race will win the fifth race, and any of the horses marked to win the sixth race will win the sixth race.

The operations may include displaying, in association with each horse of the first list of horses, a second place selection element by which a user of the graphical user interface may mark the horse as selected to finish in second place in the race, displaying, in association with each horse of the first list of horses, a third place selection element by which a user of the graphical user interface may mark the horse as selected to finishing in third place in the race, and, in response to a user interaction with the automatic ticket generation button, further marking one or more horses of the first list of horses as selected to finish in second or third place in the first race based on predicted win percentages of the horses of the first list.

Another aspect of the embodiments of the present disclosure is a method of generating a graphical user interface for horse race betting. The method includes displaying a first list of horses scheduled to run a first race from among a plurality of horses, displaying, in association with each horse of the first list of horses, a win selection element by which a user of the graphical user interface may mark the horse as selected to win the first race, displaying an automatic ticket generation button by which a user may request an automatic selection of horses, and, in response to a user interaction with the automatic ticket generation button, marking one or more horses of the first list of horses as selected to win the first race based on predicted win percentages of the horses of the first list.

Another aspect of the embodiments of the present disclosure is a system for generating a graphical user interface for horse race betting. The system includes a server in communication with a user device and a program storage medium on which are stored instructions executable by the server to perform operations for generating a graphical user interface accessible by the user device via a web browser or mobile application of the user device. The operations include displaying a first list of horses scheduled to run a first race from among a plurality of horses, displaying, in association with each horse of the first list of horses, a win selection element by which a user of the graphical user interface may mark the horse as selected to win the first race, displaying an automatic ticket generation button by which a user may request an automatic selection of horses, and, in response to a user interaction with the automatic ticket generation button, marking one or more horses of the first list of horses as selected to win the first race based on predicted win percentages of the horses of the first list.

Another aspect of the embodiments of the present disclosure is a non-transitory program storage medium on which are stored instructions executable by a processor or programmable circuit to perform operations for generating a graphical user interface for horse race betting. The operations include displaying a first list of horses scheduled to run a first race from among a plurality of horses, displaying, in association with each horse of the first list of horses, one or more eliminator elements by which a user of the graphical user interface may mark the horse as eliminated from consideration with respect to the first race, displaying an automatic ticket generation button by which a user may request an automatic selection of horses, and, in response to a user interaction with the automatic ticket generation button, marking one or more horses of the first list of horses as selected to win the first race based on predicted win percentages of the horses of the first list and constraints imposed by a user interaction with the eliminator elements.

The one or more eliminator elements associated with each horse of the first list of horses may include a race eliminator element by which the user of the graphical user interface may mark the horse as eliminated from consideration for coming in first place in the first race, eliminated from consideration for coming in second place in the first race, and eliminated from consideration for coming in third place in the first race.

The one or more eliminator elements associated with each horse of the first list of horses may include a first place eliminator element by which the user of the graphical user interface may mark the horse as eliminated from consideration for coming in first place in the first race while not being eliminated from consideration for coming in second or third place in the first race. The one or more eliminator elements associated with each horse of the first list of horses may further include a second place eliminator element by which the user of the graphical user interface may mark the horse as eliminated from consideration for coming in second place in the first race while not being eliminated from consideration for coming in first or third place in the first race. The one or more eliminator elements associated with each horse of the first list of horses may further include a third place eliminator element by which the user of the graphical user interface may mark the horse as eliminated from consideration for coming in third place in the first race while not being eliminated from consideration for coming in first or second place in the first race.

The operations may further include displaying, in association with each horse of the first list of horses, one or more single selection elements by which a user of the graphical user interface may mark the horse as singled with respect to the first race. The marking one or more horses in response to a user interaction with the automatic ticket generation button may further be based on constraints imposed by a user interaction with the one or more single selection elements.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 shows an example eliminator page of a horse race betting GUI;

FIG. 6 shows an example wager selection page of a horse race betting GUI;

FIG. 7 shows an example questionnaire page of a horse race betting GUI;

FIG. 8 shows an example ticket customization page of a horse race betting GUI;

FIG. 9 shows another example ticket customization page of a horse race betting GUI;

FIG. 12 shows an example stable management page of a horse race betting GUI that displays a list of horses running today;

FIG. 13 shows an example stable management page of a horse race betting GUI that displays a list of horses running tomorrow;

FIG. 14 shows an example stable management page of a horse race betting GUI that displays a list of stabled horses;

FIG. 15 shows an example stable management page of a horse race betting GUI that displays a list of horses associated with a trainer.

DETAILED DESCRIPTION

The present disclosure encompasses various embodiments of systems, methods, and apparatuses for generating a graphical user interface (GUI) for horse race betting. The detailed description set forth below in connection with the appended drawings is intended as a description of several currently contemplated embodiments, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
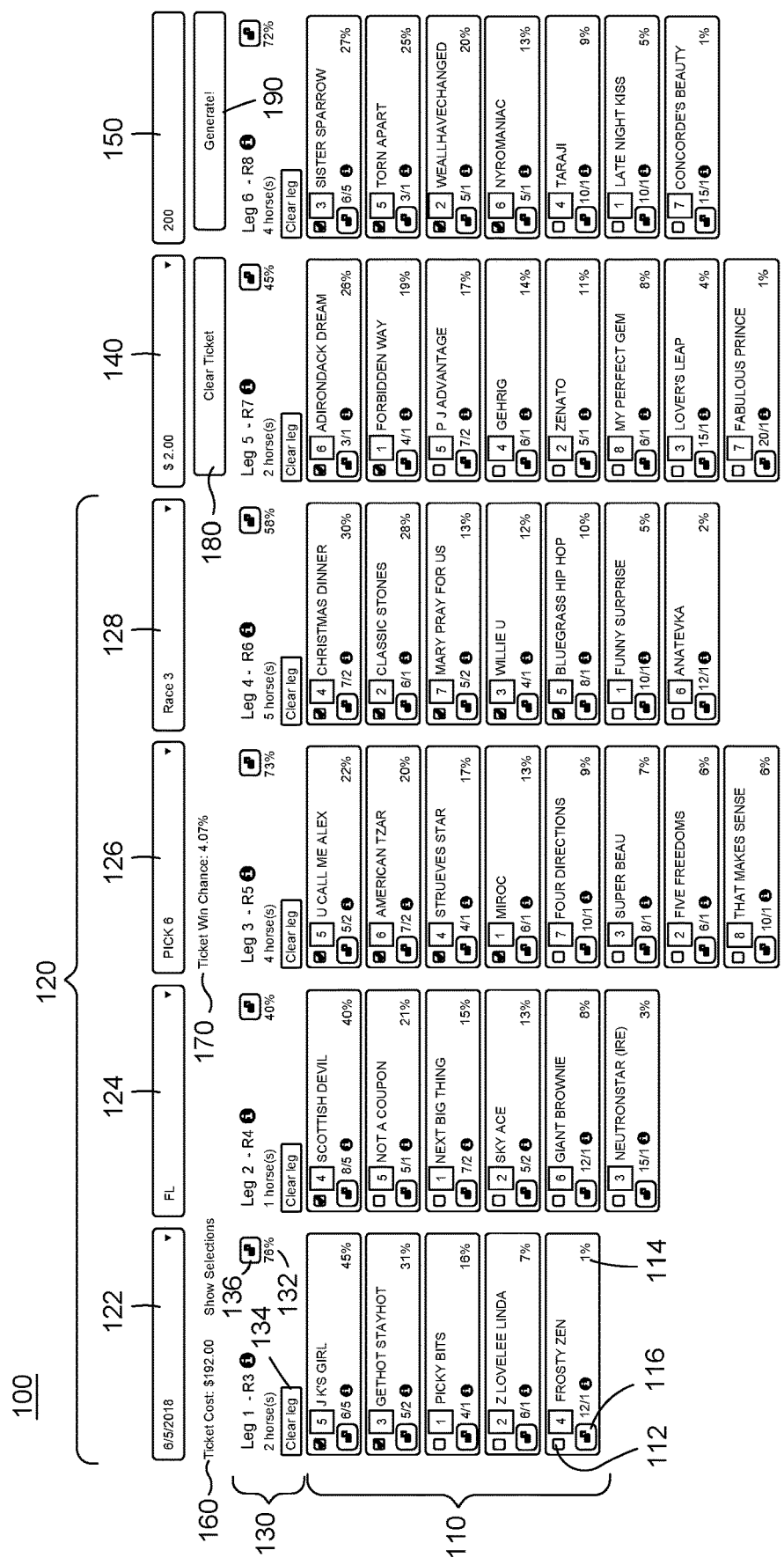
FIG. 1 shows an example view of a horse race betting graphical user interface (GUI) according to an embodiment of the present disclosure.

FIG. 1 shows an example horse race betting GUI 100 according to an embodiment of the present disclosure. Using the horse race betting GUI 100, a user wishing to generate a horse race betting ticket may, in addition to manually selecting horses to win, automatically generate a combination of selections that maximizes a function of a predicted ticket win percentage 170 within defined constraints. By supporting the automatic generation of a ticket, the horse race betting GUI 100 may serve an advising function that is absent in conventional betting tools. FIG. 1 represents a ticket generator page of the horse race betting GUI 100, which may include one or more lists 110 of horses, a race selection portion 120, a list info portion 130 corresponding to each list 110, a bet amount selector 140, a maximum ticket price selector 150, a ticket cost 160, a predicted ticket win percentage 170, a clear ticket button 180, and an automatic ticket generation button 190.

In the example of FIG. 1, six lists 110 of horses are shown: a first list 110 including horses named "J K'S GIRL," "GETHOT STAYHOT," "PICKY BITS," "Z LOVELEE LINDA," and "FROSTY ZEN," a second list 110 adjacent to the first list 110 and including horses named "SCOTTISH DEVIL," etc., a third list 110 adjacent to the second list 110 and including horses named "U CALL ME ALEX," etc., a fourth list 110 adjacent to the third list 110 and including horses named "CHRISTMAS DINNER," etc., a fifth list 110 adjacent to the fourth list 110 and including horses named "ADIRONDACK DREAM," etc., and a sixth list 110 adjacent to the fifth list 110 and including horses named "SISTER SPARROW," etc. Each of the six lists 110 may represent the horses scheduled to run a particular horse race. The lists 110 may be displayed following the user's selection of race(s) using the various selectors in the race selection portion 120.

In the example of FIG. 1, the user has selected the date "Jun. 5, 2018" using the date selector 122, selected the track "FL" using the track selector 124, selected the bet type "PICK 6" using the bet type selector 126, and selected "Race 3" as the starting race for consecutive races using the starting race selector 128. The selectors 122, 124, 126, 128 of the race selection portion 120 may be, for example, drop-down menus as shown, and may allow selection from a list of choices that is dynamically populated with actual race data (which itself may be continually updated) as the user makes selections in any order. For example, the user may first select the date "Jun. 5, 2018," e.g., by clicking on a date in a calendar or other date selection tool, where dates having no scheduled races may be omitted or indicated as unavailable (e.g. grayed out). When the user subsequently selects a track using the track selector 124, the previous selection of a date may cause the track selector 124 to populate with only those tracks having races on the selected date. In the same way, the selected date and track may cause the bet type selector 126 to populate only with permitted bet types for that date and track, and the selected date, track, and bet type may cause the starting race selector 128 to populate only with races that could legally serve as the starting race for a ticket under the already selected conditions. In the example, of FIG. 1, for example, if there are only eight scheduled races for the selected date and track, the user's selection of "PICK 6" may limit the possible starting races to Race 1, Race 2, and Race 3 (since there are not six consecutive races beginning with Race 4). Based on the user's selections, lists 110 representing the six consecutive races beginning with Race 3 may be displayed one after the other as shown. The list info portion 130 may include, for each list 110, the race number (e.g. "R3" meaning Race 3) as well as a corresponding leg number one through six for the pick 6 ticket to be generated.

In association with each horse of a given list 110, in addition to the identifying name (e.g. "FROSTY ZEN") and number (e.g. "4") of the horse, a win selection element 112 (e.g. a checkbox) may be displayed by which the user may mark the horse as selected to win the race. In the example of FIG. 1, the first list 110 shows two horses ("J K'S GIRL" and "GETHOT STAYHOT") marked in this way as selected to win the first race ("R3"), the second list 110 shows only one horse ("SCOTTISH DEVIL") marked as selected to win the second race ("R4"), etc. A user may manually generate a ticket by clicking on or otherwise interacting with the win selection elements 112 to mark or unmark horses as selected to win their respective races.

As noted above, the horse race betting GUI 100 may serve an advising function. To this end, in association with each horse of a given list 110, a predicted win percentage 114 of the horse may be displayed. For example, in the first list 110 shown in FIG. 1, "FROSTY ZEN" has a predicted win percentage 114 of only 1%, while "J K'S GIRL" has a predicted win percentage 114 of 45%. As shown, the horses of each list 110 may be ordered according to their predicted win percentages 114, with the higher predicted win percentages 114 appearing first. The predicted win percentage 114 of a horse may represent the likelihood that the horse will win the race as determined according to any algorithm (e.g. any machine learning algorithm) on the basis of publicly available information. By reviewing the predicted win percentages 114 of the horses running one or more races, the user may make a more informed decision when selecting horses to win each race. The user may, for example, compare the predicted win percentages 114 to morning line odds and/or live odds in an effort to find horses that are being undervalued (overlays) or overvalued (underlays) by the public.

The user may further input a bet amount using the bet amount selector 140 and a maximum ticket price using the maximum ticket price selector 150. Like the selectors of the race selection portion 120, the bet amount selector 140 and the maximum ticket price selector 150 may be, for example, drop-down menus, and may allow selection from a list of choices. In the example of FIG. 1, the bet amount selector 140 is a drop-down menu and the maximum ticket price selector 150 is an input field in which the user may enter any value that is equal to or greater than the selected bet amount. Since different tracks may allow different minimum bet amounts on different dates and for different bet types and races, it is contemplated that the bet amount selector 140 (and possibly the maximum ticket price selector 150) may be dynamically populated depending on the selections made in the race selection portion 120.

In the example of FIG. 1, the user has input a bet amount of $2.00 and a maximum ticket price of $200. In the case of a pick 6 ticket as shown, the bet amount of $2.00 may designate the cost of a single set of six horse selections, one for each of legs 1 through 6. So, for instance, if a user were to mark the top-listed horse in each race (i.e. the horse having the highest predicted win percentage 114) as selected to win using the win selection elements 112, the user could manually produce a ticket costing $2.00 for placing a bet that "J K'S GIRL," "SCOTTISH DEVIL," "U CALL ME ALEX," "CHRISTMAS DINNER," "ADIRONDACK DREAM," and "SISTER SPARROW" will each come in first in their respective races. The resulting ticket cost of $2.00 may be displayed as the ticket cost 160, and a predicted ticket win percentage 170 may be displayed based on the predicted win percentages 114 of the selected horses. For example, the predicted ticket win percentage 170 may be calculated by multiplying the probabilities represented by the predicted win percentages 114, e.g., 0.45*0.40*0.22*0.30*0.26*0.27≈0.083%.

By way of illustration, if the user were then to add a single mark selecting "American Tzar" as an alternative horse to win in Leg 3, the user could produce a ticket costing $4.00 for placing the resulting two bets, one bet on "J K'S GIRL," "SCOTTISH DEVIL," "U CALL ME ALEX," "CHRISTMAS DINNER," "ADIRONDACK DREAM," and "SISTER SPARROW" and one bet on "J K'S GIRL," "SCOTTISH DEVIL," "AMERICAN TZAR," "CHRISTMAS DINNER," "ADIRONDACK DREAM," and "SISTER SPARROW." The resulting ticket cost of $4.00 may be displayed as the ticket cost 160, and the predicted ticket win percentage 170 may be updated to reflect the sum of the probabilities of the two possible combinations of horses, e.g., 0.45*0.40*(0.22+0.20)*0.30*0.26*0.27≈0.159%. If the user were then to further add a single mark selecting "FORBIDDEN WAY" as an alternative horse to win in Leg 5, the user could produce a ticket costing $8.00 for placing the resulting four bets, one bet on "J K'S GIRL," "SCOTTISH DEVIL," "U CALL ME ALEX," "CHRISTMAS DINNER," "ADIRONDACK DREAM," and "SISTER SPARROW," one bet on "J K'S GIRL," "SCOTTISH DEVIL," "AMERICAN TZAR," "CHRISTMAS DINNER," "ADIRONDACK DREAM," and "SISTER SPARROW," one bet on "J K'S GIRL," "SCOTTISH DEVIL," "U CALL ME ALEX," "CHRISTMAS DINNER," "FORBIDDEN WAY," and "SISTER SPARROW," and one bet on "J K'S GIRL," "SCOTTISH DEVIL," "AMERICAN TZAR," "CHRISTMAS DINNER," "FORBIDDEN WAY," and "SISTER SPARROW." The resulting ticket cost of $8.00 may be displayed as the ticket cost 160, and the predicted ticket win percentage 170 may be updated to reflect the sum of the probabilities of the four possible combinations of horses, e.g., 0.45*0.40*(0.22+0.20)*0.30*(0.26+0.19)*0.27≈0.276%.

Along the same lines, the horse race betting GUI 100 may include, in association with each list 110, a predicted leg win percentage 132, which may be a value displayed in the leg info portion 130 of each list 110 representative of the sum of the predicted win percentages 114 of the selected horses in that leg. The predicted leg win percentage 132 may provide an indication of the chances that that particular race will be won by one of the user's selected horses. The user may, for example, wish to select horses such that all legs exceed some predicted leg win percentage 132, e.g., all legs have a predicted leg win percentage 132 greater than 50%.

If the user would like the horse race betting GUI 100 to advise on which horses to select for an optimal ticket, the user may click the automatic ticket generation button 190 to request an automatic selection of horses. In response, the horse race betting GUI 100 may mark one or more horses of each of the first, second, third, fourth, fifth, and sixth lists 110 as selected to win based on the predicted win percentages 114 of the horses. In a simple case, the automatically generated selections may maximize the predicted ticket win percentage 170 without causing the number of bets times the bet amount 140 to exceed the maximum ticket price 150. So, in the example shown in FIG. 1, where the user has input $2.00 as the bet amount and $200 as the maximum ticket price, the horse race betting GUI 100 may select a combination of horses that maximizes the predicted ticket win percentage 170 without exceeding 100 bets (since more than 100 bets times $2.00/bet would exceed $200). More generally, the automatically generated selections may maximize some function of the predicted ticket win percentage 170, as described in more detail below, within various constraints.

In the example of FIG. 1, the user has clicked the automatic ticket generation button 190 and, as a result, the horse race betting GUI 100 has selected the first two horses in Leg 1, the first horse in Leg 2, the first four horses in Leg 3, the first five horses in Leg 4, the first two horses in Leg 5, and the first four horses in Leg 6, resulting in a ticket cost 160 of $192.00 and a predicted ticket win percentage 170 of 4.07%. The automatically selected horses may be indicated by their respective win selection elements 112, e.g., by displayed checkmarks as shown, allowing the user to easily review the selections. For convenience, the number of selections in each list 110 of horses may also be displayed, e.g., in the corresponding list info portion 130 as shown (e.g. "2 horse(s)"). The user may then modify the automatic selections as he/she sees fit. For example, the user may unmark and/or mark additional win selection elements 112. The user may also clear an entire leg (i.e. remove all selections from a particular list 110) using a clear leg button 134 in the corresponding list info portion 130. The user may clear the entire ticket (i.e. remove all selections from all lists 110) using a clear ticket button 180. As the user makes changes, the ticket cost 160 and predicted ticket win percentage 170 may be automatically updated to reflect the newly selected combination of horses.

The user may wish to produce a hybrid manually/automatically generated ticket by introducing desired constraints for the horse race betting GUI 100 to take into consideration when automatically generating selections. To this end, the horse race betting GUI 100 may include, in association with each horse, a horse lock element 116 by which the user may lock the horse's marked/unmarked status. For example, after automatically generating the ticket shown in FIG. 1 using the automatic ticket generation button 190, the user may decide to make some changes upon reviewing the selections. For example, the user may have done some independent research on "PICKY BITS" in Leg 1 and may feel that the predicted win percentage 114 of 16% should be higher. The user may therefore click the win selection element 112 associated with "PICKY BITS" to mark "PICKY BITS" as selected to win and also click the horse lock element 116 associated with "PICKY BITS" to lock the marked status of this individual horse. At the same time, the user may dislike the name "SCOTTISH DEVIL" in Leg 2 and may therefore unmark "SCOTTISH DEVIL" using the associated win selection element 112 and lock the horse's unmarked status using the horse lock element 116.

Wishing to apply these manual selections as constraints in an automatically generated ticket, the user may then click the automatic ticket generation button 190 again. In response, the horse race betting GUI 100 may again mark one or more horses as selected to win, this time based on the additional constraints imposed by the horse lock elements 116. For example, the automatically generated selections may maximize the same function of the predicted ticket win percentage 170 with the same constraints imposed by the bet amount and maximum ticket price, but further with the additional requirements that "PICKY BITS" be selected in Leg 1 and that "SCOTTISH DEVIL" not be selected in Leg 2. As a result, the user may find that the horse race betting GUI 100 has made various changes since the previous automatically generated selections. For instance, the algorithm may choose several other horses in Leg 2 to replace the eliminated "SCOTTISH DEVIL" and may deselect one or more horses in other legs in order to keep the ticket cost 160 within the maximum ticket price. The user may then review the new ticket cost 160 and the new predicted ticket win percentage 170.

The horse race betting GUI 100 may further include a leg lock element 136 associated with each leg, e.g., in the list info portion 130 of each list 110 as shown. By interacting with the leg lock element 136 for a given leg, the user may simultaneously lock the marked/unmarked statuses for all horses in that leg. The horse lock elements 116 and leg lock elements 136 may change appearance to indicate that a given horse or leg is locked, for example, transitioning from an icon of an unlocked padlock as shown to an icon of a locked padlock. Clicking on a leg lock element 136 may cause all of the horse lock elements 116 to simultaneously transition to indicate that all horses of that leg are locked.

The horse race betting GUI 100 may further include various links, tabs, buttons, etc. for navigation to additional pages. For example, as shown in the example of FIG. 1, information buttons denoted by a small "i" may be used to display a pop-up window or otherwise navigate to additional detailed information about a particular horse (e.g. detailed statistics of the horse) or a particular race (e.g. detailed information about the race). Other pages may include options menus, user profile/statistics pages, links to external websites, etc.

Figure 2:
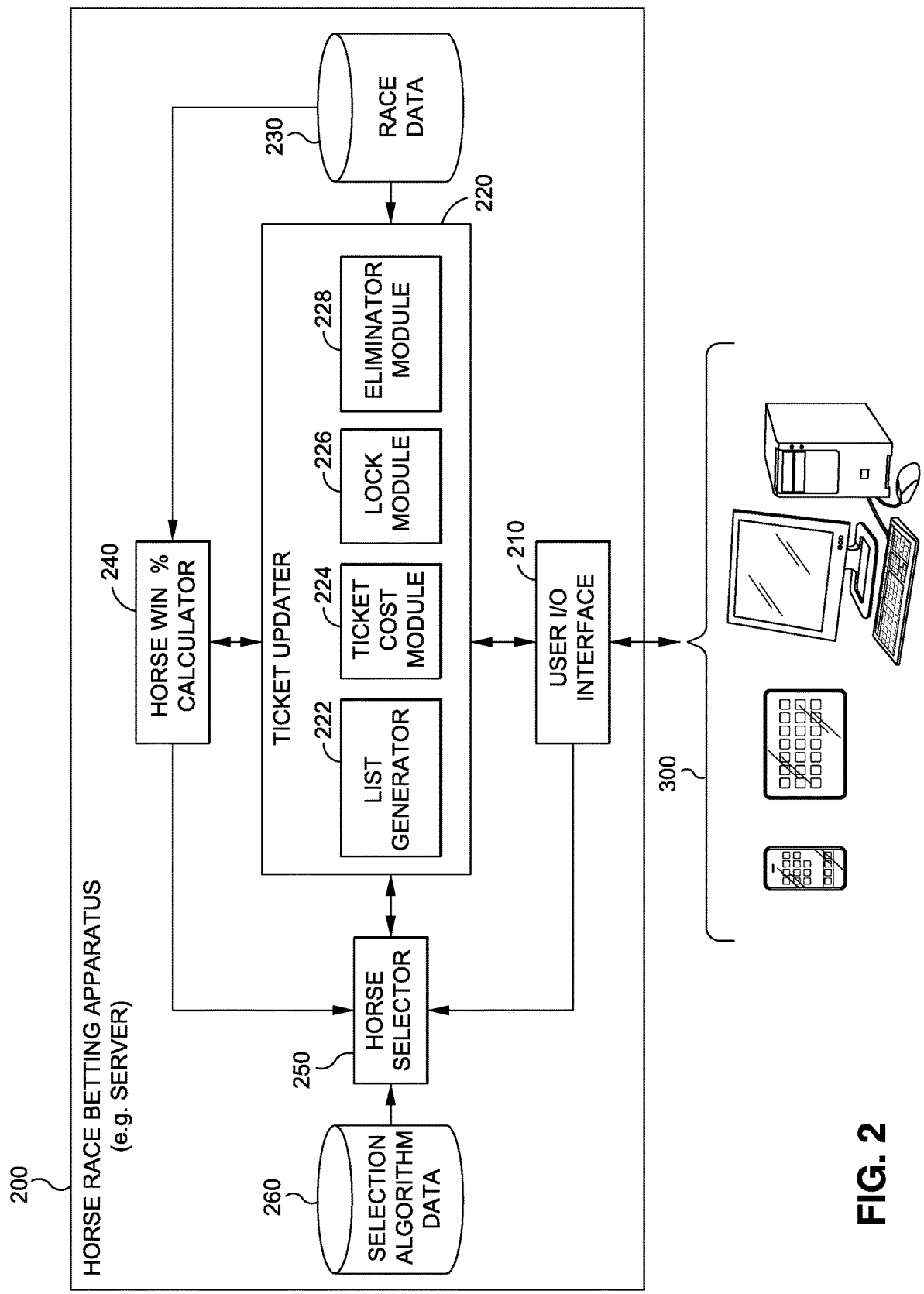
FIG. 2 shows an example horse race betting apparatus according to an embodiment of the present disclosure.

FIG. 2 shows an example horse race betting apparatus 200 according to an embodiment of the present disclosure. The horse race betting apparatus 200 may be a server or a combination of networked servers that interacts with a web browser or mobile application of a user device 300 in order to generate the horse race betting GUI 100 described above.

The horse race betting apparatus 200 may include a user I/O interface 210, a ticket updater 220, a race data storage 230, a horse win percentage calculator 240, a horse selector 250, and a selection algorithm data storage 260.

The user I/O interface 210 may receive data from and transmit data to a web browser or mobile application of a user device 300. Input data may include, for example, user interaction data of a user with the horse race betting GUI 100, such as selections of date, track, bet type, and race(s) using the selectors 122, 124, 126, 128 of the race selection portion 120, selections of bet amount and maximum ticket price using selectors 140, 150, manual selections of horses using horse win selection elements 112, requests for the horse race betting GUI 100 to automatically generate a ticket using the automatic ticket generation button 190, and interactions with the horse lock elements 116, leg lock elements 136, clear leg buttons 134, clear ticket button 180, and any other links, tabs, buttons, etc. of the horse race betting GUI 100 (e.g. the information buttons shown in FIG. 1 or other buttons for navigating to other pages). Input data may further include data associated with navigation to the page shown in FIG. 1 from a homepage of the horse race betting GUI 100, preference selection related to the horse race betting GUI 100, login information, or other data entered on a previous page of the horse race betting GUI 100, in response to which the horse race betting apparatus 200 may display the elements of the horse race betting GUI 100 described in relation to FIG. 1. Output data of the user I/O interface 210 may include data to be interpreted by a web browser or mobile application in the generation of a functional display in accordance with the horse race betting GUI 100 described herein. In this regard, it should be noted that the terms "displaying," "generating," "listing," "populating," "marking," "updating," etc. as used herein with respect to elements of the horse race betting GUI 100 may include the outputting of data from the user I/O interface 210 or another component of the horse race betting apparatus 200 for use by a user device 300.

Based on the input data received by the user I/O interface 210, the ticket updater 220 may return one or more lists 110 of horses as shown in FIG. 1. For example, the race data storage 230 may store race data from many race tracks, including race schedules, permitted bet types, permitted bet amounts, etc. and any other information to be displayed by the horse race betting GUI 100 (e.g. individual horse statistics of a plurality of horses as may be purchased from a provider of horse racing data such as TrackMaster®). When a user of a user device 300 makes a set of selections using the selectors 122, 124, 126, 128 of the race selection portion 120 of the horse race betting GUI 100, a list generator 222 of the ticket updater 220 may query the race data storage 230 for the race(s) matching the user's selections and return the associated list(s) 110 of horses for display on the user device 300 as shown in FIG. 1. In some cases, as described above, the selectors 122, 124, 126, 128 may be dynamically populated with selectable choices as selections are made. In such cases, the list generator 222 may make a series of queries to the race data storage 230 as the user's selections are made and return intermediate query results (e.g. a list of tracks having races on a selected date, a list of dates on which a selected track has races, etc.) for use in dynamically populating the selectors 122, 124, 126, 128.

In view of the fact that horses' statistics change over time, the race data in the race data storage 230 may be continually updated, e.g., over a network such as the Internet. It is also sometimes the case that the list of horses running a particular race may change for various reasons (e.g. an injury) in the days leading up to the race. In this regard, it is contemplated that a horse that is no longer running a race may still be displayed in the list 110 on the horse racing data GUI 100, e.g., with a symbol such as a strikethrough to indicate that the horse is no longer running the race and cannot be selected.

In addition to the list generator 222, the ticket updater 220 may further include a ticket cost module 224 and a lock module 226. The ticket cost module 224 may, in response to a user's interaction with the bet amount selector 140, apply the user's selection of the bet amount to calculate or update the ticket cost 160. For example, as the user manually selects horses using the horse win selection elements 112, the ticket cost module 224 may multiply the resulting number of bets (e.g. number of combinations of one selected horse per leg) by the bet amount to calculate the ticket cost 160. In some cases, the ticket cost module 224 may further refer to the user's selection of a maximum ticket price using the maximum ticket price selector 150. For example, if the calculated ticket cost 160 exceeds the selected maximum ticket price, the ticket cost module 224 may update the display of the ticket cost 160 in various ways to warn the user, e.g., displaying the ticket cost 160 in a different color such as red, displaying a pop-up cautionary warning, etc. In some cases, the ticket cost module 224 may even prevent the user from manually selecting horses that would result in the calculated ticket cost 160 exceeding the selected maximum ticket price, e.g. by deactivating the horse win selection elements 112 to disallow further manual selections.

The lock module 226 of the ticket updater 220 may manage the user's selections to lock the marked/unmarked status of individual horses and/or lists 110 based on the user's interaction with the horse lock elements 116 and/or leg lock elements 136. Such lock selections (including the marked/unmarked status) may be referred to by the horse race betting apparatus 200 when automatically generating a ticket as described in more detail below. In some cases, the lock module 226 may enforce the user's lock selections to prevent manual marking/unmarking of horse win selection elements 112. For example, the user may be prevented from modifying the horse win selection element 112 of a horse or those of a leg (and the relevant horse win selection element(s) 112 may, for example, be grayed out) until the user unlocks the corresponding horse lock element 116 or leg lock element 136.

The horse win percentage calculator 240 may calculate predicted win percentages 114 of the horses in each of a plurality of scheduled races. As noted above, the predicted win percentage 114 of a horse may represent the likelihood that the horse will win a given race as determined according to any algorithm (e.g. machine learning algorithms) on the basis of publicly available information. For example, relevant data may be obtained from a provider of horse racing data such as TrackMaster® and stored in the race data storage 230. Based on such data, the horse win percentage calculator 240 may input any combination of various data features (e.g. age of horse, horse's track record, jockey's track record, trainer's track record, etc.) into an algorithm whose output is the predicted win percentage 114. For example, past race data can be used to process past horses into arrays of data features (e.g. evaluated to −1, 0, and 1), and the race results can be used to train a Support Vector Machine (SVM) to predict horse finish order based on the data features. The SVM can then be used to predict future horse finish order and generate predicted win percentages 114 based on the same data features as applied to future races. A corresponding predicted win percentage 114 may thus be provided to the ticket updater 220 for each horse in each of the lists 110 generated by the list generator 222, such that the predicted win percentages 114 may be displayed on the horse race betting GUI 100 as shown in FIG. 1. The horse win percentage calculator 240 may further provide the predicted win percentages 114 to the horse selector 250 for use in the automatic selection of horses by the horse race betting apparatus 200.

With the lists 110 displayed on the user device 300, the user may manually mark horses as selected to win using the horse win selection elements 112. As the user marks horses in this way, the ticket updater 220 may update the display to indicate that the horses are marked (e.g. displaying a checkmark with respect to the corresponding horse win selection element 112). Based on the predicted win percentages 114 calculated by the horse win percentage calculator 240, the ticket updater 220 may further calculate and display a predicted ticket win percentage 170 as described above. The ticket updater 220 may further display the ticket cost 160 calculated by the ticket cost module 224 as well as any lock selections managed by the lock module 226.

The horse selector 250 may determine an optimal selection of horses in response to the user's interaction with the automatic ticket generator button 190. For example, upon receiving a command to perform automatic ticket generation from the user I/O interface 210, the horse selector 250 may select one or more horses in accordance with a selection algorithm stored in the selection algorithm data storage 260. To this end, the horse selector 250 may receive, as inputs to the selection algorithm, the predicted win percentages 114 calculated for each horse of each of the list(s) 110 generated by the list generator 222, along with various constraints. For example, the horse selector 250 may receive, from the ticket cost module 224, the bet amount and maximum ticket price selected by the user and may further receive, from the lock module 226, the lock selections of the user. The horse selector 250 may then select one or more horses so as to maximize a function of the predicted ticket win percentage 170 without causing a number of bets times the bet amount to exceed the maximum ticket price and without altering the marked/unmarked status of any locked horses or horses in locked legs. In the simplest case, the horse selector 250 may maximize the predicted ticket win percentage 170 itself. However, a user may in some cases be better served by maximizing a function of predicted ticket win percentage 170 and ticket cost 160, for instance. As an example, while the maximized predicted ticket win percentage 170 of 4.07% may be achieved as shown in FIG. 1 according to selections resulting in a ticket cost 160 of $192.00, it may be the case that a significant reduction in ticket cost 160 would only reduce the predicted ticket win percentage 170 by a small amount. In such case, an algorithm that took into consideration the ticket cost 160 and selected horses that resulted in a high predicted ticket win percentage 170 and a low ticket cost 160 may be optimal. It is also contemplated that the selection algorithm may further take into consideration an expected payout, e.g., as determined by morning line odds or live odds at the time the automatic ticket generation button 190 is clicked. The horse race betting apparatus 200 may include various selection algorithms in the selection algorithm data storage 260, and the horse race betting GUI 100 may allow the user to choose a preferred algorithm from an options menu.

The ticket updater 220 may update the horse race betting GUI 100 to reflect the automatic selections made by the horse selector 250. For example, the ticket updater 220 may update the display to indicate that the automatically selected horses are marked (e.g. displaying a checkmark with respect to the corresponding horse win selection elements 112). Based on the predicted win percentages 114 calculated by the horse win calculator 240, the ticket updater 220 may further recalculate and display an updated predicted ticket win percentage 170. The ticket updater 220 may further display an updated ticket cost 160 calculated by the ticket cost module 224 based on the automatically selected horses.

As described above, the user I/O interface 210 may output data to be interpreted by a web browser or mobile application in the generation of a functional display in accordance with the horse race betting GUI 100 described herein. Such data may include data that is output, updated, or managed by the ticket updater 220, such as data for displaying one or more lists 110, including predicted win percentages 114, horse selections (whether manually or automatically determined), and lock selections, as well as data for displaying list info portions 130 associated with the lists 110, a predicted ticket win percentage 150, and a ticket cost 160. Data output by the user I/O interface 210 may also include various data for displaying other static and dynamic elements of the horse race betting GUI 100, including, for example, the selectors 122, 124, 126, 128 of the race selection portion 120, bet amount selector 140, maximum ticket price selector 150, clear ticket button 180, and automatic ticket generation button 190. By communicating such data to a web browser or mobile application of a user device 300 (e.g. over a network such as the Internet), the horse race betting apparatus 200 may be regarded as displaying, generating, listing, populating, marking, updating, etc. the various elements of the horse race betting GUI 100.

Figure 3:
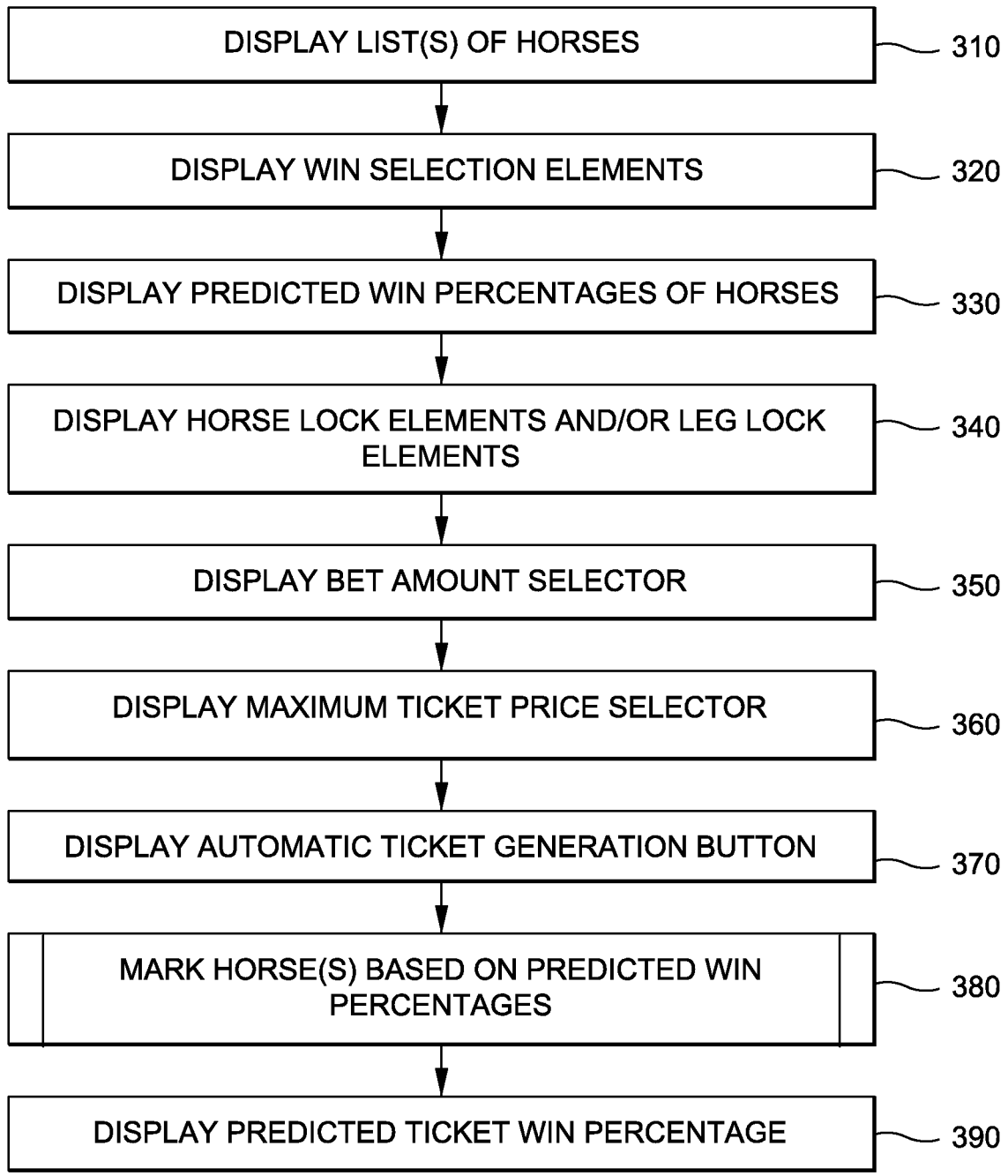
FIG. 3 shows an example operational flow according to an embodiment of the present disclosure.

FIG. 3 shows an example operational flow according to an embodiment of the present disclosure. Referring by way of example to the horse race betting GUI 100 shown in FIG. 1 and the horse race betting apparatus 200 shown in FIG. 2, the horse race betting apparatus 200 may, in any order or simultaneously in whole or in part, display one or more lists 110 of horses (step 310), display a win selection element 112 in association with each horse (step 320), display a predicted win percentage 114 in association with each horse (step 330), display a horse lock element 116 in association with each horse and/or a leg lock element 136 in association with each list 110 of horses (step 340), display a bet amount selector 140 (step 350), display a maximum ticket price selector 150 (step 360), display an automatic ticket generation button 190 (step 370), automatically mark one or more horses as selected to win based on the predicted win percentages 114 (step 380), and display a predicted ticket win percentage 170 (step 390). Steps 310-390 may be preceded by a user's selection of one or more races using selectors 122, 124, 126, 128 of a race selection portion 120, as well as by preference selection, login, navigation, etc. prior to the arrival of the user at the ticket generator page of the horse race betting GUI 100 shown in FIG. 1.

As an exemplary use case of steps 310-390, a user of the horse race betting GUI 100 may arrive at the page shown in FIG. 1 following login and/or navigation using a web browser or mobile application on a user device 300 such as a smart phone, tablet, or personal computer. In response to the user's selection of a date, track, bet type, and starting race using the selectors 122, 124, 126, 128 of the race selection portion 120, the horse race betting apparatus 200 may display one or more lists 110 of horses corresponding to the user's selections (step 310), along with corresponding win selection elements 112 (step 320), predicted win percentages 114 (step 330), and horse/leg lock elements 116/136 (step 340). For example, the list generator 222 of the ticket updater 220 may retrieve the relevant lists 110 from the race data storage 230 in response to the user's selections, along with additional information such as morning line or live odds (e.g. 6/5 for "J K'S GIRL"), horse/jockey/trainer statistics, etc. with which to populate the list 110 and/or details pages for each horse (e.g. pages accessible via an information button or other link). The list generator 222 may further pass the lists 110 to the horse win percentage calculator 240, which may calculate the predicted win percentages 114 of each horse for the display. The horse race betting apparatus 200 may further display a bet amount selector 140 (step 350), a maximum ticket price selector 150 (step 360), and an automatic ticket generation button 190 (step 370). As the user selects horses using the win selection elements 112, the horse race betting apparatus 200 may display or update the predicted ticket win percentage 170 based on the user's manual selections (step 390). At some point, the user may wish to generate an automatic ticket, so the user may click the automatic ticket generation button 190. In response, the horse selector 250 of the horse race betting apparatus 200 may automatically generate selections of horses for each of the lists 110 according to an algorithm stored in the selection algorithm data storage 260. The ticket updater 220 may update the horse race betting GUI 100 to mark the automatically selected horses and may update the predicted ticket win percentage 170 based on the automatic selections (step 390). The horse race betting apparatus 200 may further display or update the ticket cost 160 based on the user's manual or automatic selections and on the user's input in the bet amount selector 140 and maximum ticket price selector 150.

When the user is satisfied with the selection of horses, the user may wish to finalize the ticket. Features supporting the finalization of a ticket may include, for example, an option to print the ticket, save the ticket locally or on a remote server, submit/purchase the ticket (e.g. via a link to a third-party website or a third-party API providing direct bet placement functionality), etc. The horse race betting apparatus 200 may further store records of such finalized tickets, which may be used to generate betting statistics/feedback associated with the particular user.

Figure 4:
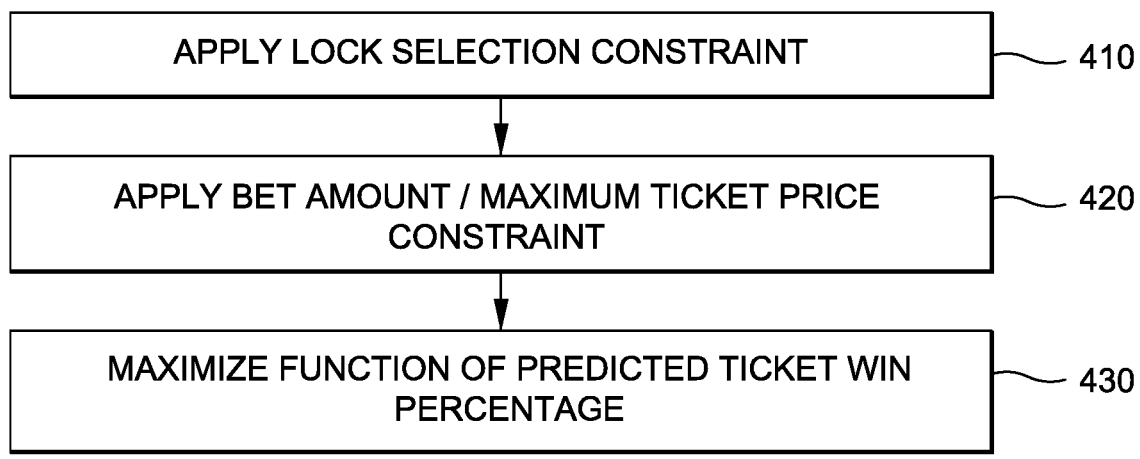
FIG. 4 shows another example operational flow according to an embodiment of the present disclosure

FIG. 4 shows another example operational flow according to an embodiment of the present disclosure, detailing example sub-steps of step 380 of FIG. 3. As noted above with respect to FIG. 3, the horse selector 250 of the horse race betting apparatus 200 may automatically generate selections of horses for each of the lists 110 according to an algorithm stored in the selection algorithm data storage 260. Such automatic selection algorithm may take into account, in addition to the predicted win percentages 114 of each individual horse, various constraints imposed by the ticket cost module 224 and lock module 226 in accordance with the user's input bet amount, maximum ticket price, and lock selections. The horse selector 250 may apply a lock selection constraint (step 410) based on the user's lock selections managed by the lock module 226 and may apply a bet amount/maximum ticket price constraint (step 420) based on the user's bet amount and maximum ticket price inputs managed by the ticket cost module 224. For example, in the example of FIG. 1, the automatically generated selections may maximize a function of the predicted ticket win percentage 170 (step 430) without causing the number of bets times the bet amount 140 to exceed the maximum ticket price 150 and without altering any of the locked selections. Steps 410, 420, and 430 may be performed in any order or simultaneously, depending on the specifics of the algorithm.

In the example horse race betting GUI 100 shown in FIG. 1, the user has selected "PICK 6" using the bet type selector 126. However, the disclosure is not intended to be limited to the "PICK 6" bet type. In the case of other horizontal bet types (e.g. daily double, PICK 3, PICK 4, PICK 5), the horse race betting GUI 100 may function as described above, with the number of lists 110 varying depending on the number of races/legs associated with the bet type. In this regard, it should be noted that every feature described above in relation to the "PICK 6" bet type may equally apply in the case of other horizontal bet types as well as to vertical bet types. In a case where a user selects a vertical bet type for a single race (e.g. exacta, trifecta, superfecta, quinella), a single list 110 may be displayed on the horse race betting GUI 100 and, depending on the bet type, additional selection buttons may be displayed in addition to the win selection element 112. For example, separate first place, second place, and third place selection elements may be displayed in association with each horse of the list 110. By interacting with the first place, second place, and third place selection elements of each horse, a user may mark one or more horses as selected to finish in first, second, or third place in the race. In response to a user interaction with the automatic ticket generation button 190, the horse race betting apparatus 200 may automatically mark one or more horses of the list 110 as selected to finish in first place, second place, or third place the race based on the predicted win percentages 114 of the horses. A ticket cost 160 and predicted ticket win percentage 170 may be calculated based on the manual or automatic selections according to the rules of the bet type. It is further contemplated that, in addition to the predicted win percentage 114 of each horse, a predicted second place percentage and a predicted third place percentage may be displayed and/or used by the horse race betting apparatus 200 to automatically select horses (e.g. when maximizing a function of a predicted ticket win percentage 170 with constraints as described above). It is contemplated that additional finishing position selection elements may also be included, such as fourth place selection elements, fifth place selection elements, etc.

Figure 5:
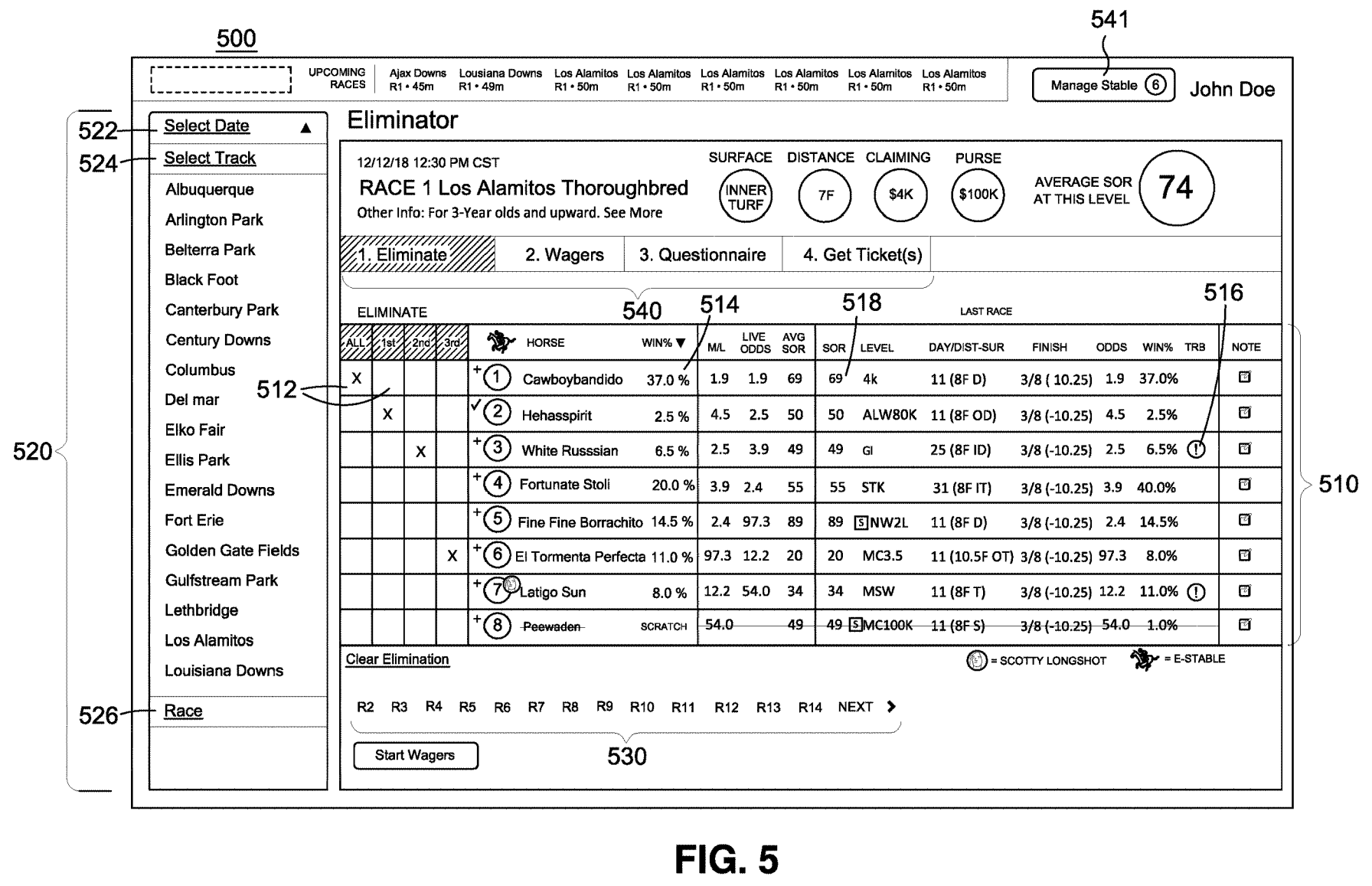

FIG. 5 shows an example horse race betting GUI 500 according to an embodiment of the present disclosure. Using the horse race betting GUI 500, a user wishing to generate one or multiple horse race betting tickets may, in addition to making manual selections, follow a step-by-step process to automatically generate a combination of selections that maximizes a function of a predicted ticket win percentage within defined constraints. By supporting the automatic generation of one or more tickets, the horse race betting GUI 500 may serve an advising function that is absent in conventional betting tools. FIG. 5 represents an eliminator page of the horse race betting GUI 500, which may include a list 510 of horses, a race selection portion 520, a race navigator 530, and a ticket generation navigator 540.

The eliminator page shown in FIG. 5 may allow a user of the horse race betting GUI 500 to globally eliminate one or more horses so that they will not appear in any automatically generated tickets. In the example of FIG. 5, a list 510 of horses is shown including horse number 1 (named "Cawboybandido"), horse number 2 (named "Hehasspirit"), horse number 3 (named "White Russsian"), horse number 4 (named "Fortunate Stoli"), horse number 5 (named "Fine Fine Borrachito"), horse number 6 (named "El Tormenta Perfecta"), horse number 7 (named "Latigo Sun"), and horse number 8 ("Peewaden"). The list 510 may represent the horses scheduled to run a particular horse race, in this case "RACE 1" at the "Los Alamitos" track on the date "Dec. 12, 2018" as displayed. The list 510 may be displayed following the user's selection of a race using the various selectors in the race selection portion 520. The user may also navigate between races associated with the selected track/date using the race navigator 530, e.g., by clicking R2 (i.e. Race 1), R3 (i.e. Race 3), etc. As the user navigates between races, a different list 510 corresponding to the selected race may be displayed. As noted above, it may sometimes be the case that the horses running a particular race changes for various reasons (e.g. an injury) in the days leading up to the race. In this example, horse 8 is such a horse and thus appears with a strikethrough to indicate that the horse is no longer running the race.

In the example of FIG. 5, the user has selected the date "Dec. 12, 2018" using the date selector 522, selected the track "Los Alamitos" using the track selector 524, and selected "RACE 1" using the race selector 526. The selectors 522, 524, 526 of the race selection portion 520 may be dynamically populated drop-down menus that function in the same way as the selectors 122, 124, 128 of the race selection portion 120 of FIG. 1. In the example of FIG. 5, the user is in the process of selecting a track from a list of tracks ("Albuquerque," "Arlington Park," etc.) using the track selector 524, after which the user might click the race selector 526 to collapse the list of tracks and expand a list of races below the race selector 526. It is also contemplated that the words "Select Date," "Select Track," and "Race" of the selectors 522, 524, 526 may only appear when no selection has been made and may be replaced with the user's selections as they are made. Based on the user's selections, a list 510 representing the selected race may be displayed as shown. The race navigator 530 may allow the user to thereafter navigate to other races at the same track on the same date (e.g. R2 through R14) without changing the selected race. The race navigator 530 may be displayed as tabs/pages as shown, as a drop-down menu, etc.

In association with each horse of a given list 510, in addition to the identifying name (e.g. "Cawboybandido") and number (e.g. "1") of the horse, one or more eliminator elements 512 (e.g. checkboxes) may be displayed by which the user may mark the horse as eliminated from consideration for coming in first place in the race ("1st"), coming in second place in the race ("2nd"), coming in third place in the race ("3rd"), or a combination thereof. For example, if the user wanted to eliminate "Cawboybandido" from consideration for placing in the race (i.e. coming in first or second place), the user could mark the eliminator elements 512 labeled "1st" and "2nd" corresponding to "Cawboybandido." In the example shown, the user wants to eliminate "Cawboybandido" from all consideration, so the user has marked the eliminator element 512 labeled "ALL" corresponding to "Cawboybandido." As a result, the horse race betting GUI 500 will not select "Cawboybandido" when automatically generating a ticket. In this way, the user may navigate through the races at a given track on a given date and eliminate one or more horses in each race. It is further contemplated that additional eliminator elements 512 may be included as well, for example, for fourth place, fifth place, etc. The eliminations may apply globally to any ticket generated using the horse race betting GUI 500.

As noted above, the horse race betting GUI 500 may serve an advising function. To this end, in association with each horse of a given list 510, a predicted win percentage 514 of the horse may be displayed. For example, in the list 510 for Race 1 shown in FIG. 1, "Cawboybandido" has a predicted win percentage 514 of only 37.0%, while "Hehasspirit" has a predicted win percentage 514 of only 2.5%. The highest predicted win percentage 514 of each list 510 may be highlighted so as to be noticeable to the user. In addition, the horses of the list 510 may be ordered according to their predicted win percentages 514 using sort buttons (e.g. downward facing arrow next to "WIN %"), with the higher predicted win percentages 514 appearing first. The predicted win percentage 514 of a horse may be the same as the predicted win percentage 114 discussed above with respect to FIG. 1. By reviewing the predicted win percentages 514 of the horses running one or more races, the user may make a more informed decision when eliminating horses.

A trouble indicator 516 may also appear in association with some of the horses in the list 510. The trouble indicator 516 may indicate that the corresponding horse experienced some unusual difficulty in its previous race, such as tiring early, falling down, or losing a rider. Unlike conventional race statistics, which might include descriptions of such unusual difficulties together with uneventful descriptions for other horses (e.g. even pace, good finish, etc.), the trouble indicator 516 may be provided only for unusual difficulty (e.g. for horses 3 and 7 in FIG. 5) while being absent for horses that experienced no unusual difficulty (e.g. horses 1, 2, 4-6, and 8). To this end, a list of significant words or phrases may be stored in a database of the horse race betting apparatus 200, and the horse race betting GUI 500 may display the trouble indicator 516 only when published information about a horse's past race includes a word or phrase on the list. In this way, the user can more quickly and easily notice which horses might require special consideration. As shown, the trouble indicator 516 itself might be only a symbol (e.g. an exclamation point), which may then be clicked or rolled-over to navigate to a details page (e.g. pop-up window) showing the details of the trouble that the horse experienced.

The list 510 of horses may also include a strength of race (SOR) 518 for each horse. The SOR 518, which may be presented for a previous race and/or as an average, may be a numerical representation of how competitive a given race was. For example, a race with a higher SOR 518 may indicate that the horses in that race were generally stronger than those in a race with a lower SOR 518. The SOR 518 may be calculated based on a variety of factors, for example, the win/loss records of the horses in the race, the money earned on the race, the monetary values (e.g. claiming amounts) of the horses, etc.

The ticket generation navigator 540 may be a series of tabs or other tool for navigating through the process of generating one or more tickets using the horse race betting GUI 500. As shown in FIG. 5, a portion of the ticket generation navigator 540 labeled "1. Eliminate" is highlighted, indicating that the user is currently on the eliminator page. As shown, later parts of the process include "2. Wagers," "3. Questionnaire," and "4. Get Ticket(s)." When the user has finished making any desired eliminations on the eliminator page, the user may click the next part of the process, e.g. "2. Wagers," or may click a "Next" button (not shown) or a "Start Wagers" button to be directed to the next part of the process. It is contemplated that a user need not be constrained to the specific order set out in the ticket generation navigator 540 and may freely backtrack to earlier steps of the process as well as jump around and skip steps.

Figure 6:
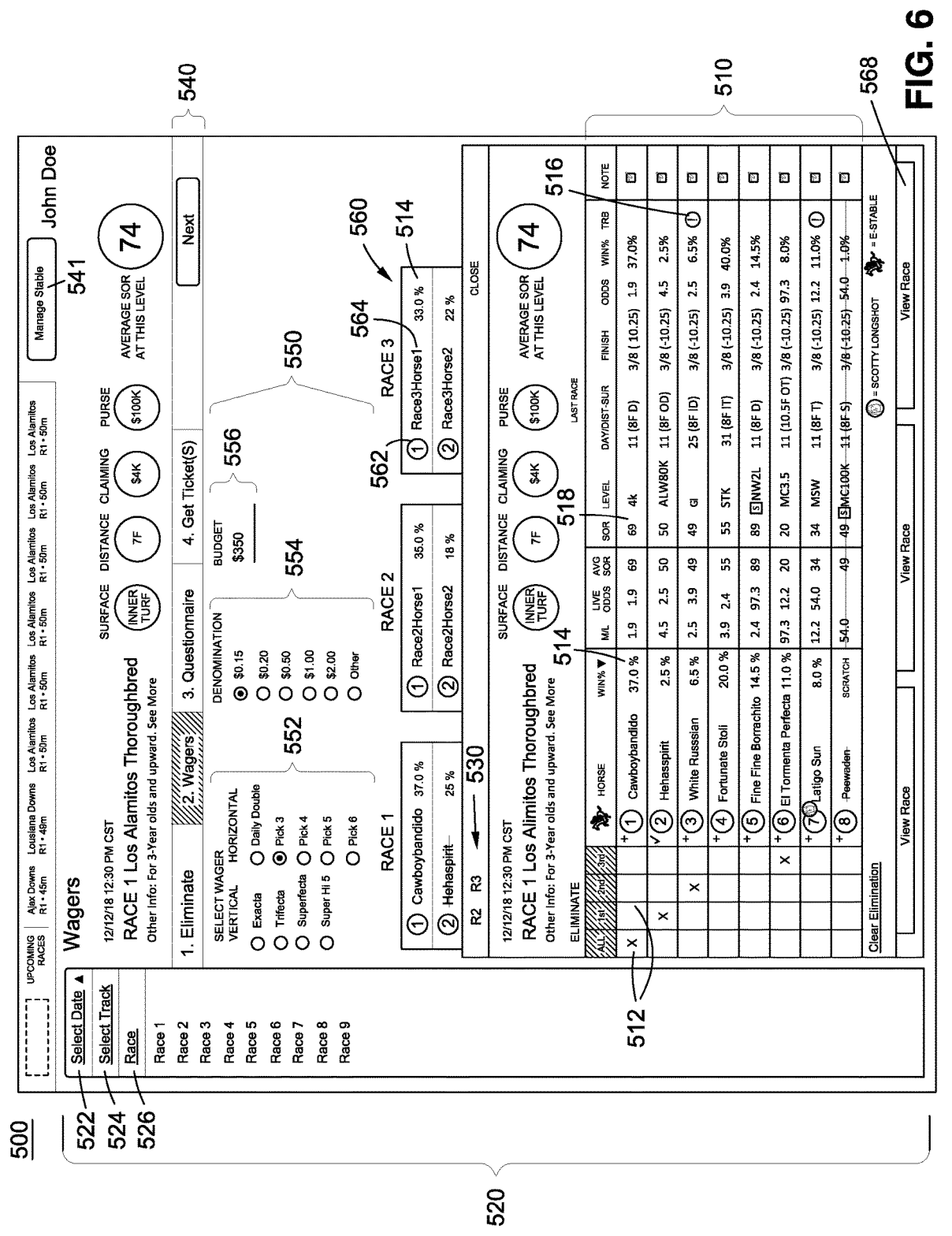

FIG. 6 represents a wager selection page of the horse race betting GUI 500, which may include, in addition to the race selection portion 520 and ticket generation navigator 540, a wager selector 550 and a race summary 560. A user of the horse race betting GUI 500 may, for example, navigate to the wager selection page using the ticket generation navigator

540 after choosing eliminations using the eliminator page described in relation to FIG. 5. The wager selection page of the horse race betting GUI 500 may allow a user of the horse race betting GUI 500 to select a wager type, bet amount, and budget for the automatic generation of one or more tickets. To this end, the wager selector 550 may include a bet type selector 552, a bet amount selector 554, and a budget selector 556.

The bet type selector 552 may allow the user to select from among various bet types, which in some cases may include both horizontal and vertical bet types. In the example of FIG. 1, the bet type selector 552 (e.g. radio buttons under the heading "SELECT WAGER") allows selection from among horizontal bet types including Daily Double, Pick 3, Pick 4, Pick 5, and Pick 6 as well as vertical bet types including Exacta, Trifecta, Superfecta, and Super Hi 5. As described above with respect to the bet type selector 126 of the horse race betting GUI 100, the bet type selector 552 of the horse race betting GUI 500 may be populated with permitted bet types for the selected date, track, and race. In the case of horizontal bet types, which involve multiple races, the horse race betting GUI 500 may interpret the selected race as the first leg of the horizontal bet. So, for example, if the user selected Race 4 using the race selector 526 of the race selection portion 520, a selection of Pick 3 using the bet type selector 552 may result in Races 4, 5, and 6 as the selected races for one or more Pick 3 tickets.

The bet amount selector 554 (e.g. radio buttons under the heading "DENOMINATION") may allow the user to input a bet amount and may be the same as the bet amount selector 140 described in relation to the horse race betting GUI 100. In the example shown in FIG. 6, the bet amount selector 554 includes an "Other" option, which may allow the user to input bet amounts that are not specifically listed. For example, in a case where any bet amount is permitted as long as it is not below a minimum bet amount, the bet amount selector 554 may list several bet amounts spaced according to typical betting practices of users (e.g. $0.15, $0.20, $0.50, $1.00, $2.00) with the "Other" option allowing the user to select an atypical amount.

The budget selector 556 may allow the user to enter the user's own budget, i.e. the maximum amount that the user would like to spend on the generation of one or more tickets. The budget selector 556 may be the same as the maximum ticket price selector 150 described in relation to the horse race betting GUI 100. However, in the case of the horse race betting GUI 500, it is further contemplated that multiple tickets may be automatically generated for the user. As such, the budget selector 556 may be used to input a total budget that is the user's maximum for a plurality of tickets, which may be generated as described in more detail below. As described above, since different tracks may allow different minimum bet amounts on different dates and for different bet types and races, it is contemplated that the bet amount selector 554 and budget selector 556, like the bet amount selector 140 and maximum ticket price selector 150 of the horse race betting GUI 100, may be dynamically populated depending on other selections made by the user.

The race summary 560 (partially covered in FIG. 6), may be a summary display of the races currently selected according to the user's selections. For example, in a case where the user has selected the date "12/12/18" using the date selector 522, selected the track "Los Alamitos" using the track selector 524, selected Race 1 using the race selector 526, and selected Pick 3 using the bet type selector 552, the race summary 560 may show summary views (e.g. horse numbers 562, horse names 564, and win percentages 514 as shown) of Races 1, 2, and 3 on that date at that track. The race summary 560 may further change as the user selects different bet types using the bet type selector 552. For example, a single race may be shown for vertical bets, while multiple consecutive races may be shown for horizontal bets. By presenting a limited portion of the data for each race, the race summary 560 reduces screen clutter while still helping the user visualize his/her bets while choosing a bet type, bet amount, and budget. This may be especially important considering the limited screen real estate of mobile computing devices (e.g. smart phones). By clicking a "View Race" button 568, the user may pull up a detailed view of one of the races listed in the race summary 560. In some cases, this may be a windowed view of the eliminator page of FIG. 5, which may allow the use to modify the selected eliminations using the eliminator elements 512 as described above. The user may navigate between detailed views of the races using the race navigator 530.

Figure 7:
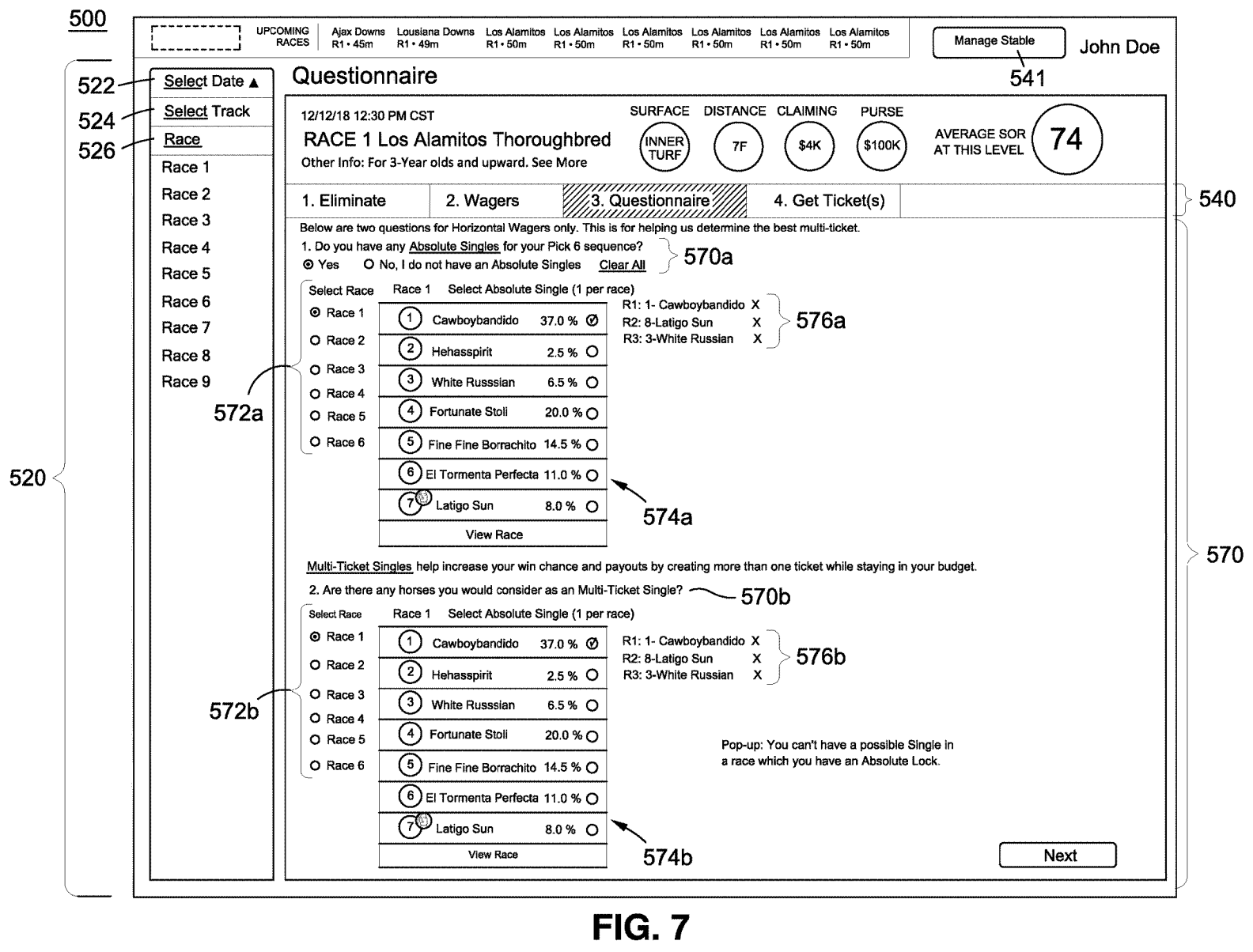

FIG. 7 represents a questionnaire page of the horse race betting GUI 500, which may include, in addition to the race selection portion 520 and ticket generation navigator 540, one or more questionnaire items 570. A user of the horse race betting GUI 500 may, for example, navigate to the questionnaire page using the ticket generation navigator 540 after choosing eliminations using the eliminator page described in relation to FIG. 5 and selecting a wager using the wager selection page described in relation to FIG. 6. The questionnaire page may prompt the user to input additional selections to assist the horse race betting GUI 500 in automatically generating one or more tickets for the user that match the user's preferences and betting strategy. The questionnaire page shown in FIG. 7 includes a series of easy-to-understand questions, which may enhance usability of the horse race betting GUI 500. However, it is contemplated that the questionnaire items 570 may instead or additionally include non-question prompts to obtain the user's selections.

The questions asked on the questionnaire page may depend on the user's bet type as input using the bet type selector 552 of FIG. 6. In the example shown, the two questionnaire items 570 are unique to horizontal betting. The first questionnaire item 570*a* asks the user if the user has any "absolute singles." If the user answers "Yes," the first questionnaire item 570*a* may expand to prompt the user to choose absolute singles for each race. For example, as shown in FIG. 7, the user may have selected a Pick 6 sequence of races on the wager selection page of FIG. 6. When the user answers "Yes" to the first questionnaire item 570*a*, the first questionnaire item 570*a* may expand to produce an appropriate race selector 572*a* (e.g. radio buttons for "Race 1" through "Race 6"), an absolute single selector 574*a*, and an absolute singles list 576*a*. An absolute single, as the term is used herein, refers to a horse that is the sole horse selected to win a given race in a horizontal bet (e.g. Pick 6) for all tickets generated by the horse race betting GUI 500. In other words, the user is only interested in generating tickets with the selected absolute single and no other horses selected to win that particular leg. In the example, shown, the user has navigated to Race 1 using the race selector 572*a* and selected "Cawboybandido" as an absolute single using the absolute single selector 574*a* (e.g. by placing a checkmark in the circle on the right side of the list entry item for "Cawboybandido"). Since the user can select at most one horse as an absolute single in a given race, the other horses (horses 2-7) are not selectable and may be grayed out to show that no further selections are possible. As shown in the absolute singles list 576*a*, the user has similarly selected absolute singles in Race 2 and Race 3. By clicking the "x" mark next to a horse's name in the absolute singles list 576a, the user may remove a selection. A "Clear All" button may also be used to clear all of the user's absolute singles in a single click. Based on the user's selected absolute singles, the horse race betting GUI 500 will generate a ticket in which only the one chosen horse is selected to win in each leg for which there is an absolute single.

The second questionnaire item 570b asks the user if the user has any "multi-ticket singles." If the user answers "Yes," the second questionnaire item 570b may expand to prompt the user to choose multi-ticket singles for each race. For example, as shown in FIG. 7, the user may have selected a Pick 6 sequence of races on the wager selection page of FIG. 6. When the user answers "Yes" to the second questionnaire item 570b, the second questionnaire item 570b may expand to produce an appropriate race selector 572b (e.g. radio buttons for "Race 1" through "Race 6"), a multi-ticket single selector 574a, and a multi-ticket singles list 576b. A multi-ticket single, as the term is used herein, refers to a horse that is the sole horse selected to win a given race in a horizontal bet (e.g. Pick 6) for at least one ticket generated by the horse race betting GUI 500. In other words, the user is interested in generating at least one ticket with the chosen single and no other horses selected to win that particular leg. In the example shown, the user has navigated to Race 1 using the race selector 572b and selected "Cawboybandido" as multi-ticket single using the multi-ticket single selector 574b (e.g. by placing a checkmark in the circle on the right side of the list entry item for "Cawboybandido"). Since it is possible to select multiple horses as multi-ticket singles in a given race, the other horses (horses 2-7) remain selectable. (On the other hand, if the user had selected any absolute singles for a given race, the horse race betting GUI 500 may make it impossible to choose any multi-ticket singles and may gray out the entire race in the multi-ticket singles selector 574b with an indication that the chosen absolute single is already checked.) As shown in the multi-ticket singles list 576b, the user has similarly selected multi-ticket singles in Race 2 and Race 3. As in the case of the absolute ticket singles list 576a, the user may remove selections (e.g. by clicking the "x" mark next to a horse's name in the multi-ticket singles list 576b). Based on the user's selected multi-ticket singles, the horse race betting GUI 500 will generate two or more tickets in which each horse chosen to be a multi-ticket single for a given leg is the sole horse selected to win that leg on at least one ticket.

Figure 8:
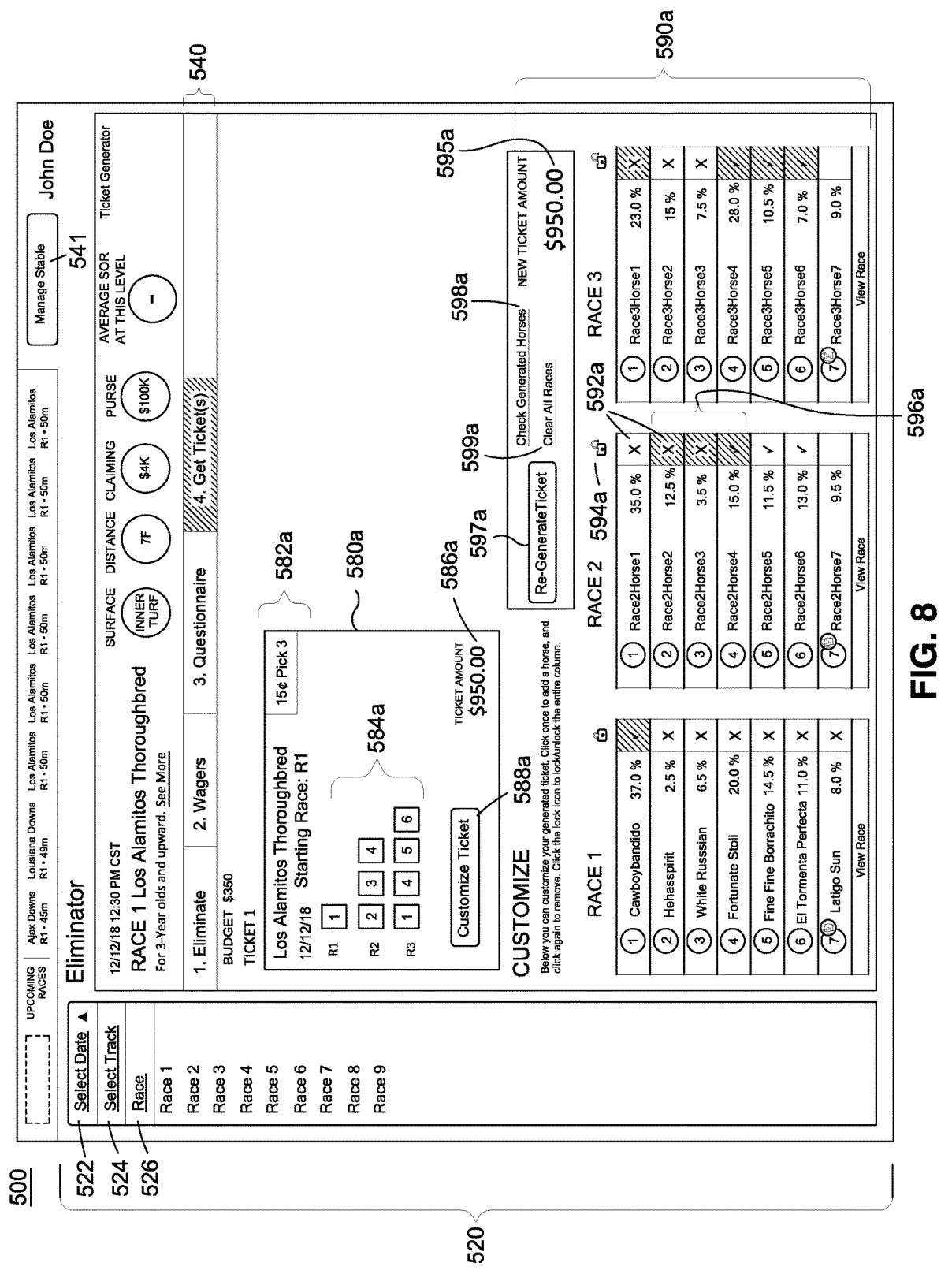

FIG. 8 represents a ticket customization page of the horse race betting GUI 500, which may include, in addition to the race selection portion 520 and ticket generation navigator 540, a ticket display 580a and a ticket customizing tool 590a. With the user having navigated through the eliminator page of FIG. 5, wager selection page of FIG. 6, and questionnaire page of FIG. 7 (e.g. using the ticket generation navigator 540), the horse race betting GUI 500 may generate one or more tickets based on the user's selections. In this regard, the ticket generation navigator 540 may serve as an automatic ticket generation button (like the automatic ticket generation button 190 of the horse race betting GUI 100) insofar as it may be used to generate the ticket(s) and/or navigate to a page of the horse race betting GUI 500 on which the generated ticket(s) are displayed. The ticket display 580a thus may show the results of the automatic ticket generation. In the example of FIG. 8, a single ticket ("TICKET 1") is displayed. In the case of multiple tickets, the additional tickets (e.g. "TICKET 2" etc.) may be displayed simultaneously (e.g. side-by-side) or may be individually viewable using tabs or other navigation tools. As shown, the ticket display 580a may show race/wager information 582a about the selected date (e.g. "Dec. 12, 2018"), the selected track (e.g. "Los Alamitos"), the selected race(s) (e.g. "starting race: R1"), the selected bet type (e.g. "Pick 3") and the selected bet amount (e.g. "15¢"), bet information 584a indicating which horses are selected in which legs (e.g. "R1," "R2," and "R3") of the horizontal bet, the ticket cost 586a (which may be calculated by multiplying the number of bets times the bet amount in the same way as the ticket cost 160 described in relation to the horse race betting GUI 100), and a customize ticket button 588a. As shown, the bet information 584a may be shown in a highly condensed summary manner using only horse numbers. Limiting the data presented in this way may be especially important considering the limited screen real estate of mobile computing devices (e.g. smart phones).

In a case where a user has selected one or more multi-ticket singles, the horse race betting GUI 500 may generate two or more tickets to be displayed in the ticket display 580a. For example, the multiple tickets may be generated according to the following scheme. When a single multi-ticket single is chosen in a single race, the horse race betting GUI 500 may generate two tickets, one with the horse selected as a single and one without the horse selected as a single. In other words, the horse race betting GUI 500 may generate a first ticket with all of the user's constraints (e.g. eliminations, absolute singles, etc.) including the multi-ticket single and a second ticket with all of the user's constraints except ignoring the constraint imposed by the multi-ticket single. The constraints imposed by the bet amount and budget of the user may be imposed, for example, by dividing the budget evenly among the tickets to be generated. For example, if the user's budget is $30.00 and the user's bet amount is $0.15, the horse race betting GUI 500 may generate two tickets by dividing the budget by two and generating two $15 ticket each with 100 $0.15 cent selections (e.g. 100 combinations in the case of horizontal betting). When two or more multi-ticket singles are chosen in respective races, the horse race betting GUI 500 may generate one ticket per multi-ticket single. For example, if Horse 1 is selected as a multi-ticket single in Race 1, Horse 5 is selected as a multi-ticket single in Race 2, and Horse 7 is selected as a multi-ticket single in Race 3, the horse race betting GUI 500 may generate a first ticket with Horse 1 singled in Race 1 ignoring the other two multi-ticket singles, a second ticket with Horse 5 singled in Race 2 ignoring the other two singles, and a third ticket with Horse 7 singled in Race 3 ignoring the other two singles. Other possible schemes are contemplated as well. For example, the horse race betting GUI 500 may always generate one more ticket than the number of multi-ticket singles, where the extra ticket completely ignores the multi-ticket single constraints. In some cases, the horse race betting GUI 500 may allow a user to choose more than one multi-ticket single in the same leg in response to the second questionnaire item 570b, such that the resulting multiple tickets may include tickets with alternative horses singled for the same race.

Referring back to the example shown in FIG. 8, if the user would like to make a change to the automatically generated ticket(s) shown in the ticket display 580a, the user may click the customize ticket button 588a, in response to which the horse race betting GUI 500 may produce the ticket customizing tool 590a. The ticket customizing tool 590a may show summary views of each race similar to the race summary 560 described in relation to the wager selection page of FIG. 6. In addition to horse numbers, horse names, win percentages, and "View Race" buttons as described in relation to the race summary 560, the ticket customizing tool 590a may further include one or more manual selection elements 592a corresponding to each horse and a lock element 594a corresponding to each race. In the example of FIG. 8, each horse has an associated manual selection element 592a in the form of a checkbox that may be unfilled, checked (indicating that the horse is selected to win), or x-marked (indicating that the horse is selected not to win). Initially, the checkboxes may be unfilled except for legs including a single (absolute or multi-ticket). For example, in Race 1, "Cawboybandido" may be selected as a single, in which case the manual selection element 592a associated with "Cawboybandido" will be checked and the manual selection elements 592a associated with the other horses in Race 1 will be x-marked. The manual selection elements 592a corresponding to the horses of Race 2 and Race 3 may all be initially unfilled. For improved usability, it is contemplated that the horses selected in the currently generated ticket (i.e. the one displayed in the ticket display 580a) may be indicated in the ticket customizing tool 590a, for example, by highlighting or other indication. For example, it can be understood from highlighting 596a that horses 2, 3, and 4 are selected for Race 2 in the currently generated ticket.

As the user reviews the selections, the user may disagree with the automatically generated ticket and wish to manually select one or more horses to win or not to win a race. To do so, the user may simply click on the corresponding manual selection element 592a to make a checkmark appear, designating that the horse is selected to win, or may click twice on the corresponding manual selection element 592b to make an x-mark appear, designating that the horse is selected not to win. A third click may reset the manual selection element 592a back to an unfilled state. Each checkmark or x-mark has the effect of locking the selection. That is, in subsequent automatic generations of the ticket, the horse race betting GUI 500 will abide by the checkmarks and x-marks as additional constraints dictating which horses must or cannot be selected. In addition, a modified ticket amount 595a displayed in the customizing tool 590a may be updated to reflect the changing ticket cost as the user manually marks manual selection elements 592a. A user may also click on the lock element 594a to auto-populate all of the unfilled manual selection elements 592a for that race as x-marks. The lock element 594a may thus have the effect of locking the race so that only the manually checked horses and no others may be selected to win.

After the user is satisfied with any manual selections using the manual selection elements 592a, the user may click the re-generate ticket button 597a of the ticket customizing tool 590a. In response to the user's interaction with the re-generate ticket button 597a, the horse race betting GUI 500 may automatically generate a new ticket, this time under the additional constraints imposed by the user's manual selections, and display the new ticket in the ticket display 580a. Because the horse race betting GUI 500 re-determines the best ticket within the user's budget while abiding by the additional constraints, the resulting ticket may differ from the previous ticket beyond the manual selections made by the user (resulting in a new ticket amount 586a that might differ from the modified ticket amount 595a as it appeared prior to re-generating the ticket).

The ticket customizing tool 590a may further include various additional functionality to improve usability, such as a check generated horses button 598a and a clear all races button 599a. As explained above, the ticket customizing tool 590a may display horses that have been selected in the current generated ticket together with some indication, e.g. highlighting 596a, to point them out to the user. If the user agrees with all or most of the automatically selected horses and only wishes to make a few changes, the user might begin by clicking the check generated horses button 598a to place checkmarks in all of the manual selection elements 592a corresponding to automatically selected horses (e.g. those having highlighting 596a). The user may then tweak the automatic selections by adding a few additional checkmarks or changing a few checkmarks to x-marks, while leaving the majority of the automatically generated selections intact. As noted above, however, clicking the re-generate ticket button 597a may sometimes result in significant changes to the automatically generated ticket even when the user makes relatively minor changes. For example, the removal of one selected horse in one race may cause the horse race betting GUI 500 to add several other horses in other races in order to generate the best possible ticket within the user's budget.

The clear all horses button 599a may be used to reset all manual selection elements 592a in all races to the unfilled state, except for those that are dictated by an absolute single or multi-ticket single. Thus, by clicking the clear all horses button 599a followed by the re-generate ticket button 597a, the user may re-generate the ticket that was originally generated prior to any manual selections made using the ticket customizing tool 590a.

Figure 9:
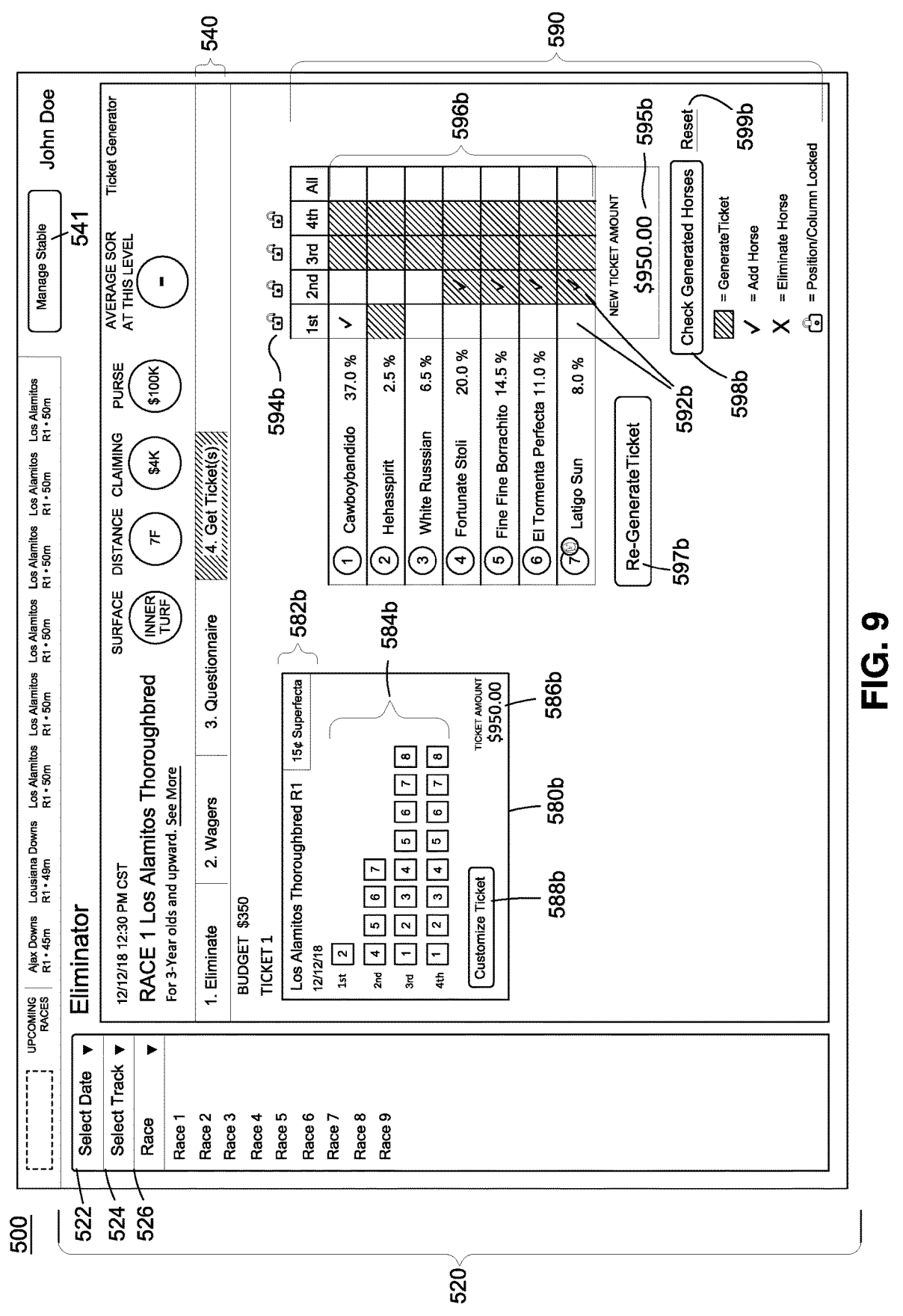

FIG. 9 shows the ticket customization page of the horse race betting GUI 500 in the case of vertical betting. Whereas in the case of horizontal betting (see FIG. 8), the ticket customization page included a ticket display 580a and a ticket customizing tool 590a for horizontal betting, the ticket customization page of the vertical betting example of FIG. 9 includes a ticket display 580b and a ticket customizing tool 590b for vertical betting. The race selection portion 520 and ticket generation navigator 540 may also be displayed. As shown, the ticket display 580b may show race/wager information 582b about the selected date (e.g. "Dec. 12, 2018"), the selected track (e.g. "Los Alamitos"), the selected race(s) (e.g. "R1"), the selected bet type (e.g. "Superfecta") and the selected bet amount (e.g. "15¢"), bet information 584b indicating which horses are selected to come in first, second, third, and fourth place in the race, the ticket cost 586b (which may be calculated by multiplying the number of bets times the bet amount in the same way as the ticket cost 160 described in relation to the horse race betting GUI 100), and a customize ticket button 588b. As shown, the bet information 584b may be shown in a highly condensed summary manner using only horse numbers. Limiting the data presented in this way may be especially important considering the limited screen real estate of mobile computing devices (e.g. smart phones).

If the user would like to make a change to the automatically generated ticket(s) shown in the ticket display 580b, the user may click the customize ticket button 588b, in response to which the horse race betting GUI 500 may produce the ticket customizing tool 590b. The ticket customizing tool 590b may show a summary view of the race (one race for a vertical bet) similar to the race summary 560 described in relation to the wager selection page of FIG. 6. In addition to horse numbers, horse names, win percentages, and "View Race" buttons as described in relation to the race summary 560, the ticket customizing tool 590b may further include one or more manual selection elements 592b corresponding to each horse (e.g. one for each finishing position $1^{st}$, $2^{nd}$, $3^{rd}$, $4^{th}$, and one for "All" finishing positions) and a lock element 594b corresponding to each finishing position. In the example of FIG. 9, each horse has an associated manual selection element 592b in the form of a checkbox that may be unfilled, checked (indicating that the horse is selected to come in the designated finishing position), or x-marked (indicating that the horse is selected not to come in the designated finishing position). Initially, the checkboxes may be unfilled. For improved usability, it is contemplated that the horses selected in the currently generated ticket (i.e. the one displayed in the ticket display 580*b*) may be indicated in the ticket customizing tool 590*b*, for example, by highlighting or other indication. For example, it can be understood from highlighting 596*b* that, in the currently generated ticket, horse 2 is selected to come in first place, horses 4-7 are selected to come in second place, horses 1-8 are selected to come in third place, and horses 1-8 are selected to come in fourth place.

As the user reviews the selections, the user may disagree with the automatically generated ticket and wish to manually select one or more horses to finish differently in the race. To do so, the user may simply click on the corresponding manual selection element 592*b* to make a checkmark appear, designating that the horse is selected to finish in the corresponding finishing position, or may click twice on the corresponding manual selection element 592*b* to make an x-mark appear, designating that the horse is selected not to finish in the corresponding finishing position. A third click may reset the manual selection element 592*b* back to an unfilled state. Each checkmark or x-mark has the effect of locking the selection. That is, in subsequent automatic generations of the ticket, the horse race betting GUI 500 will abide by the checkmarks and x-marks as additional constraints dictating which horses must or cannot be selected. In addition, a modified ticket amount 595*b* displayed in the customizing tool 590*b* may be updated to reflect the changing ticket cost as the user manually marks manual selection elements 592*b*. A user may also click on the lock element 594*b* to auto-populate all of the unfilled manual selection elements 592*b* for that finishing position as x-marks. The lock element 594*b* may thus have the effect of locking the finishing position so that only the manually checked horses and no others may be selected to finishing in that finishing position.

Just like in the case of horizontal betting (see FIG. 8), after the user is satisfied with any manual selections using the manual selection elements 592*b*, the user may click the re-generate ticket button 597*b* of the ticket customizing tool 590*b*. In response to the user's interaction with the re-generate ticket button 597*b*, the horse race betting GUI 500 may automatically generate a new ticket, this time under the additional constraints imposed by the user's manual selections, and display the new ticket in the ticket display 580*b*. Because the horse race betting GUI 500 re-determines the best ticket within the user's budget while abiding by the additional constraints, the resulting ticket may differ from the previous ticket beyond the manual selections made by the user (resulting in a new ticket amount 586*b* that might differ from the modified ticket amount 595*b* as it appeared prior to re-generating the ticket).

The ticket customizing tool 590*b* may further include various additional functionality to improve usability, such as a check generated horses button 598*b* and a reset button 599*b*. As explained above, the ticket customizing tool 590*b* may display horses that have been selected in the current generated ticket together with some indication, e.g. highlighting 596*b*, to point them out to the user. Just like in the case of horizontal betting (see FIG. 8), if the user agrees with all or most of the automatically selected horses and only wishes to make a few changes, the user might begin by clicking the check generated horses button 598*b* to place checkmarks in all of the manual selection elements 592*b* corresponding to automatically selected horses (e.g. those having highlighting 596*b*). The user may then tweak the automatic selections by adding a few additional checkmarks or changing a few checkmarks to x-marks, while leaving the majority of the automatically generated selections intact. As noted above, however, clicking the re-generate ticket button 597*b* may sometimes result in significant changes to the automatically generated ticket even when the user makes relatively minor changes. For example, the removal of one selected horse in one finishing position may cause the horse race betting GUI 500 to add several other horses in other finishing positions in order to generate the best possible ticket within the user's budget.

The reset button 599*b* may be used to reset all manual selection elements 592*b* in all finishing positions to the unfilled state. Thus, by clicking the reset button 599*b* followed by the re-generate ticket button 597*b*, the user may re-generate the ticket that was originally generated prior to any manual selections made using the ticket customizing tool 590*b*.

Referring back to the horse race betting apparatus 200 of FIG. 2, the horse race betting apparatus 200 may further generate the horse race betting GUI 500 described above. In this regard, the input data of the user I/O interface 210 may include, for example, user interaction data of a user with the horse race betting GUI 500, such as selections of date, track, and race using the selectors 522, 524, 526 of the race selection portion 520, eliminations designated using the eliminator elements 512, selections of bet type, bet amount, and budget using selectors 552, 554, and 556 of the wager selector 550, selections input using questionnaire items 570 (e.g. absolute singles and multi-ticket singles in the case of horizontal betting), requests for the horse race betting GUI 500 to automatically generate a ticket using the ticket generation navigator 540 or re-generate ticket button 597*a*, 597*b*, manual selections of horses to win or not to win using manual selection elements 592*a*, manual selections of horses to finish or not to finish in designated places using manual selection elements 592*b*, and interactions with the lock elements 594*a*, 594*b*, check generated horses button 598*a*, 598*b*, clear all races button 599*a*, and any other links, tabs, buttons, etc. of the horse race betting GUI 500 (e.g. links to additional information or other buttons for navigating to other pages). Input data may further include data associated with navigation to the page shown in FIG. 5 from a homepage of the horse race betting GUI 500, preference selection related to the horse race betting GUI 500, login information, or other data entered on a previous page of the horse race betting GUI 500, in response to which the horse race betting apparatus 200 may display the elements of the horse race betting GUI 500 described in relation to FIGS. 5-9. Output data of the user I/O interface 210 may include data to be interpreted by a web browser or mobile application in the generation of a functional display in accordance with the horse race betting GUI 500 described herein. In this regard, it should be noted that the terms "displaying," "generating," "listing," "populating," "marking," "updating," etc. as used herein with respect to elements of the horse race betting GUI 500 may include the outputting of data from the user I/O interface 210 or another component of the horse race betting apparatus 200 for use by a user device 300.

Based on the input data received by the user I/O interface 210, the ticket updater 220 may return one or more lists 510 of horses and/or race summaries 560 as shown in FIGS. 5-9. For example, in the same way as described above in relation to the horse race betting GUI 100, the race data storage 230 may store information to be displayed by the horse race betting GUI 500. When a user of a user device 300 makes a set of selections using the selectors 522, 524, 526 of the race selection portion 520 and/or selectors 552, 554, and 556 of the wager selector 550 of the horse race betting GUI 500, the list generator 222 of the ticket updater 220 may query the race data storage 230 for the race(s) matching the user's selections and return the associated list(s) 510 of horses for display on the user device 300 as shown in FIGS. 5 and 6. In some cases, as described above, the selectors 522, 524, 526, 552, 554, 556 may be dynamically populated with selectable choices as selections are made. In such cases, the list generator 222 may make a series of queries to the race data storage 230 as the user's selections are made and return intermediate query results (e.g. a list of tracks having races on a selected date, a list of dates on which a selected track has races, etc.) for use in dynamically populating the selectors 522, 524, 526, 552, 554, 556.

The horse win percentage calculator 240 may calculate predicted win percentages 514 of the horses in each of a plurality of scheduled races in the same way as described above in relation to the predicted win percentages 114 of the horse race betting GUI 100. A corresponding predicted win percentage 514 may thus be provided to the ticket updater 220 for each horse in each of the lists 510 generated by the list generator 222, such that the predicted win percentages 514 may be displayed on the horse race betting GUI 500 as shown in FIGS. 5-9. The horse win percentage calculator 240 may further provide the predicted win percentages 514 to the horse selector 250 for use in the automatic selection of horses by the horse race betting apparatus 200.

As in the case of the case of the horse race betting GUI 100, the horse selector 250 may determine an optimal selection of horses in response to the user's interaction with an automatic ticket generator button, this time in the form of the ticket generation navigator 540 ("4. Get Ticket(s)"), re-generate ticket button 597a, 597b, or other button. For example, upon receiving a command to perform automatic ticket generation from the user I/O interface 210, the horse selector 250 may select one or more horses in accordance with a selection algorithm stored in the selection algorithm data storage 260. To this end, the horse selector 250 may receive, as inputs to the selection algorithm, the predicted win percentages 514 calculated for each horse of each of the list(s) 510 generated by the list generator 222, along with various constraints. For example, the horse selector 250 may receive, from the ticket cost module 224, the bet amount and maximum ticket price selected by the user. The horse selector 250 may further receive, from the lock module 226, the lock selections of the user, which in the case of the horse race betting GUI 500 may include the user's selections made using the manual selection elements 592a, 592b and lock elements 594a, 594b (see FIGS. 8 and 9) and the questionnaire items 570a, 570b (see FIG. 7). In the case of the horse race betting GUI 500, the horse selector 250 may further receive, from an eliminator module 228 of the ticket updater 220, the user's eliminations designated using the eliminator elements 512 (see FIG. 5). The horse selector 250 may then select one or more horses so as to maximize a function of the predicted ticket win percentage (e.g. in the same way that a function of the predicted ticket win percentage 170 of the horse race betting GUI 100 is maximized) without causing a number of bets times the bet amount to exceed the user's budget and without altering the status of any locked horses, locked legs or finishing positions, absolute or multi-ticket singles, or eliminated horses. In the case of two or more tickets being generated, the horse selector 250 may determine a maximum ticket price for each ticket by dividing the user's budget evenly among the tickets to be generated or according to some other scheme.

The ticket updater 220 may update the horse race betting GUI 500 to reflect the automatic selections made by the horse selector 250. For example, the ticket updater 220 may update the horse race betting GUI 500 to produce/update a ticket customization page having a ticket display 580a, 580b as described above in relation to FIGS. 8 and 9.

In relation to the horse race betting GUI 500, the ticket cost module 224 may further update the modified ticket amount 595a, 595b as the user makes manual selections using the customizing tool 590a, 590b (see FIGS. 8 and 9), i.e. without necessarily requesting re-generation of an automatically generated ticket. In this regard, the ticket cost module 224 may in some cases update the display of the modified ticket amount 595a, 595b in various ways to warn the user, e.g., displaying the modified ticket amount 595a, 595b in a different color such as red, displaying a pop-up cautionary warning, etc. as described above in relation to the horse race betting GUI 100.

As described above, the user I/O interface 210 may output data to be interpreted by a web browser or mobile application in the generation of a functional display in accordance with the horse race betting GUI 100 described herein. Such data may include data that is output, updated, or managed by the ticket updater 220, including any data and static/dynamic elements displayed by the horse race betting GUI 500 as shown and described above. By communicating such data to a web browser or mobile application of a user device 300 (e.g. over a network such as the Internet), the horse race betting apparatus 200 may be regarded as displaying, generating, listing, populating, marking, updating, etc. the various elements of the horse race betting GUI 500.

Figure 10:
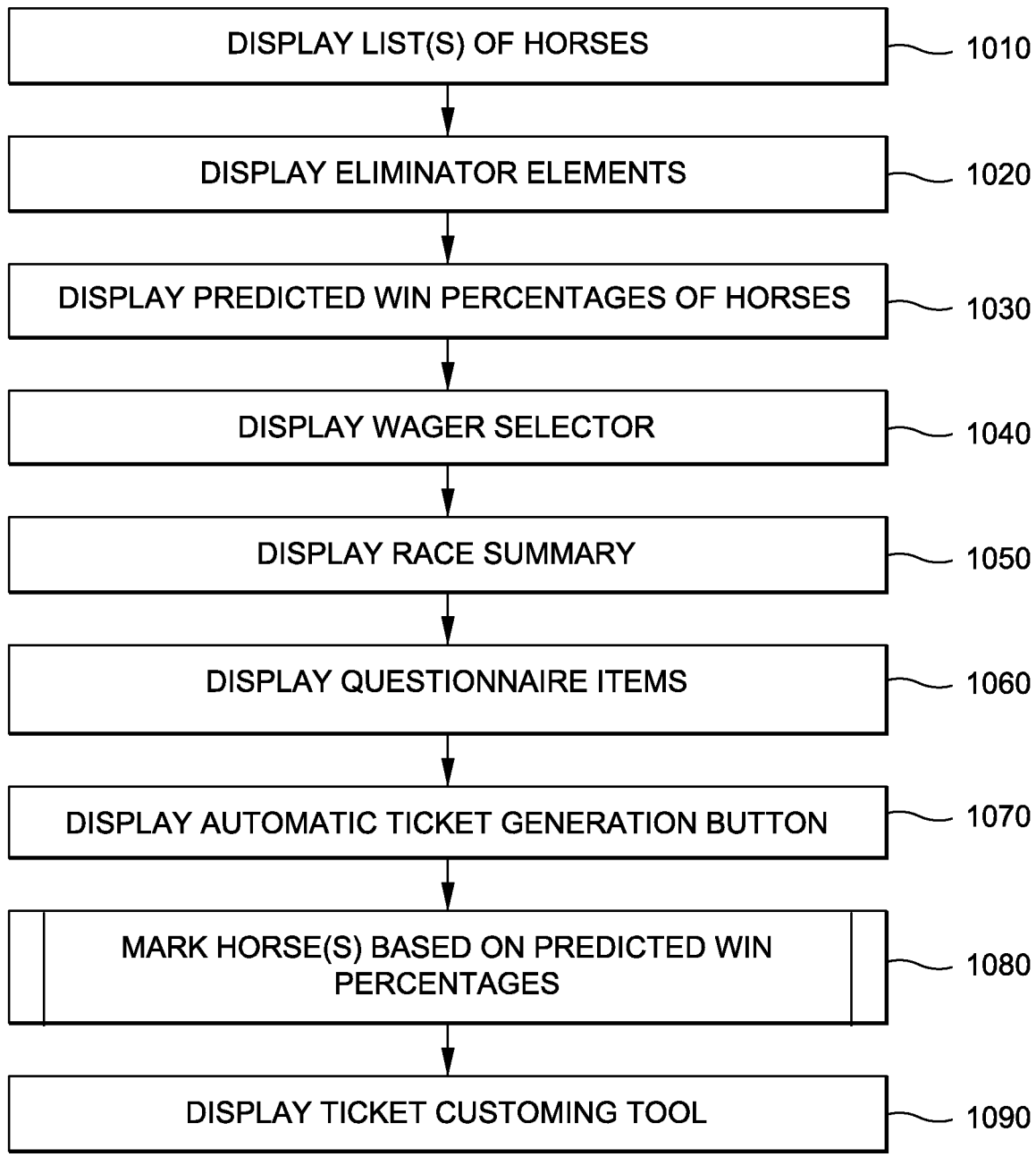
FIG. 10 shows another example operational flow according to an embodiment of the present disclosure.

FIG. 10 shows an example operational flow according to an embodiment of the present disclosure. Referring by way of example to the horse race betting GUI 500 shown in FIGS. 5-9 and the horse race betting apparatus 200 shown in FIG. 2, the horse race betting apparatus 200 may, in any order or simultaneously in whole or in part, display one or more lists 510 of horses (step 1010), display one or more eliminator elements 512 in association with each horse of the one or more lists 510 (step 1020), display a predicted win percentage 514 in association with each horse (step 1030), display a wager selector 550 (step 1040), display a race summary 560 (step 1050), display questionnaire items 570 (step 1060), display an automatic ticket generation button 540 (step 1070), automatically mark one or more horses as selected to win based on the predicted win percentages 514 (step 1080), and display a ticket customizing tool 590a, 590b (step 1090). Steps 1010-1090 may be preceded by a user's selection of one or more races using selectors 522, 524, 526 of a race selection portion 520, as well as by preference selection, login, navigation, etc. prior to the arrival of the user at the pages of the horse race betting GUI 500 shown in FIGS. 5-9.

As an exemplary use case of steps 1010-1090, a user of the horse race betting GUI 500 may arrive at the page shown in FIG. 5 following login and/or navigation using a web browser or mobile application on a user device 300 such as a smart phone, tablet, or personal computer. In response to the user's selection of a date, track, and race using the selectors 122, 124, 126 of the race selection portion 520, the horse race betting apparatus 200 may display one or more lists 510 of horses corresponding to the user's selections (step 1010), along with corresponding eliminator elements 512 (step 1020) and predicted win percentages 514 (step 1030). For example, the list generator 222 of the ticket updater 220 may retrieve the relevant lists 110 from the race data storage 230 in response to the user's selections, along with additional information such as morning line or live odds (e.g. 1.9 for "Cawboybandido"), horse/jockey/trainer statistics, etc. with which to populate the list 510 and/or details pages for each horse (e.g. pages accessible via an information button or other link). The list generator 222 may further pass the lists 510 to the horse win percentage calculator 240, which may calculate the predicted win percentages 514 of each horse for the display. Upon the user's navigation to the wager selection page shown in FIG. 6, the horse race betting apparatus 200 may further display a wager selector 550 (step 1040) and race summary 560 (step 1050), and the user may input wager information including the bet type, bet amount, and budget. In the case of horizontal bets, the races for which the ticket will be generated may depend on the selected bet type in addition to the selected race (i.e. the starting race). After the wager information is entered, the user may navigate to the questionnaire page shown in FIG. 7, at which point the horse race betting apparatus 200 may further display questionnaire items 570 (step 1060) specific to the selected bet type.

At any stage in the process, the horse race betting apparatus 200 may further display an automatic ticket generation button, which may be in the form of the "4. Get Ticket(s)" stage of the ticket generation navigator 540 (step 1070). When the user clicks the automatic ticket generation button, the horse race betting apparatus 200 may automatically mark one or more horses as selected to win based on the predicted win percentages 514 (step 1080). For example, the horse selector 250 of the horse race betting apparatus 200 may automatically generate selections of horses for each of the lists 510 associated with the user's selected race and bet type according to an algorithm stored in the selection algorithm data storage 260. The ticket updater 220 may update the horse race betting GUI 500 to generate a ticket display 580a, 580b accordingly as shown in FIGS. 8 and 9. Lastly, the horse race betting apparatus 200 may display a ticket customizing tool 590a, 590b (step 1090). After the user selects horses using the manual selection elements 592a, 592b and lock elements 594a, 594b, the horse race betting apparatus 200 may update the ticket display 580a, 580b based on the user's manual selections in response to the user's interaction with the re-generate ticket button 597a, 597b.

When the user is satisfied with the selection of horses, the user may wish to finalize the ticket. As in the case of the horse race betting GUI 100, features of the horse race betting GUI 500 supporting the finalization of a ticket may include, for example, an option to print the ticket, save the ticket locally or on a remote server, submit/purchase the ticket (e.g. via a link to a third-party website or a third-party API providing direct bet placement functionality), etc. The horse race betting apparatus 200 may further store records of such finalized tickets, which may be used to generate betting statistics/feedback associated with the particular user.

Figure 11:
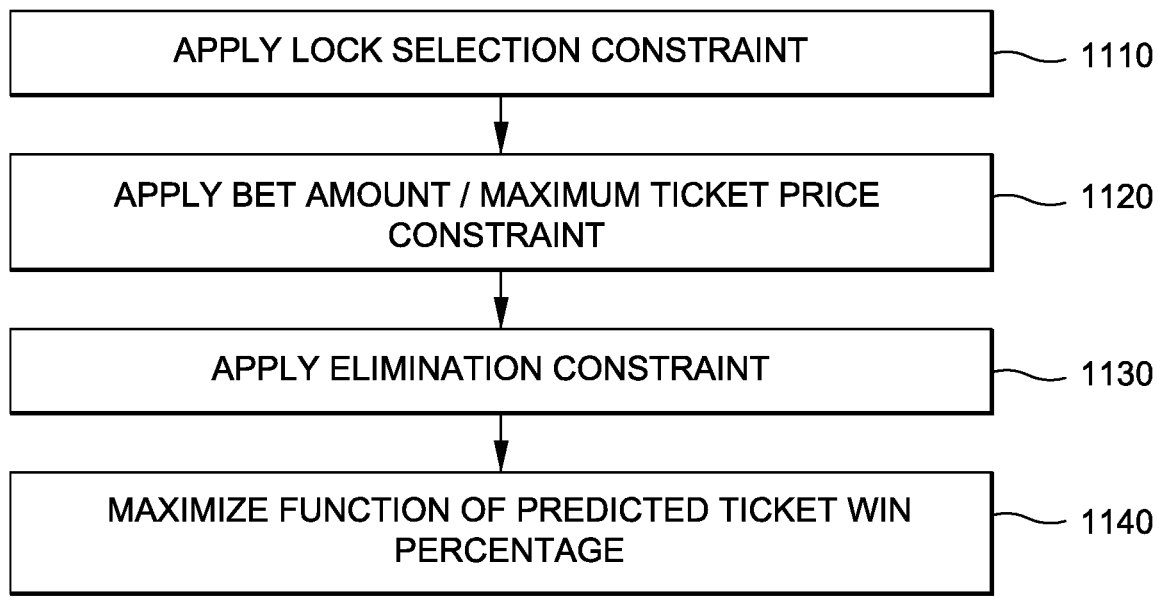
FIG. 11 shows another example operational flow according to an embodiment of the present disclosure.

FIG. 11 shows another example operational flow according to an embodiment of the present disclosure, detailing example sub-steps of step 1080 of FIG. 10. As noted above with respect to FIG. 10, the horse selector 250 of the horse race betting apparatus 200 may automatically generate selections of horses for each of the lists 510 associated with the user's selected race and bet type according to an algorithm stored in the selection algorithm data storage 260. Such automatic selection algorithm may take into account, in addition to the predicted win percentages 514 of each individual horse, various constraints imposed by the ticket cost module 224, lock module 226, and eliminator module 228 in accordance with the user's input bet amount, budget, and selections made using the eliminator elements 512 (see FIG. 5), questionnaire items 570a, 570b (see FIG. 7), and manual selection elements 592a, 592b and lock elements 594a, 594b, (see FIGS. 8 and 9). The horse selector 250 may apply a lock selection constraint (step 1110) based on the user's questionnaire responses, manual selections, and lock selections managed by the lock module 226 and may apply a bet amount/maximum ticket price constraint (step 1120) based on the user's bet amount and maximum ticket price inputs managed by the ticket cost module 224. As noted above, in the case of multiple tickets being generated, the maximum ticket price constraint may be determined by dividing the user's budget among the tickets, evenly or otherwise. The horse selector 250 may further apply an eliminator constraint (step 1130) based on the user's eliminations managed by the eliminator module 228. As in the case of the horse race betting GUI 100, the automatically generated selections may maximize a function of a predicted ticket win percentage (step 1140) without causing the number of bets times the bet amount to exceed the maximum ticket price or budget and without violating any of the constraints. Steps 1110, 1120, 1130, and 1140 may be performed in any order or simultaneously, depending on the specifics of the algorithm.

FIGS. 12-15 show a series of stable management pages of the horse race betting GUI 500, which may further be produced by the horse race betting apparatus 200 of FIG. 2. When a user of the horse race betting GUI 500 wishes to track a horse from race to race, the user may have an option of placing the horse in a personalized list of horses referred to herein as the user's stable. The data representing a user's stable may be stored in a database of the horse race betting apparatus 200 so as to be accessible to the currently logged in user (e.g. "John Doe" as indicated in the upper-righthand corner of FIG. 5). When a user wishes to add a horse to the user's stable, the user may simply click an "add to stable" button, which, in the case of the horse race betting GUI 500 is depicted as a small plus "+" icon to the left of the horse number (see FIG. 5). Upon clicking the plus icon, the corresponding horse may be added to the user's stable and the plus icon may change to indicate that the horse is in the user's stable. As shown in FIG. 5, for example, it can be seen that "Hehasspirit" is in the user's stable because the plus icon has been replaced with a checkmark icon. To access the stable management pages, a user may click the manage stable button 541 (see FIG. 5), which may include a badge or other indicator of how many of the user's stabled horses are scheduled to run today ("6" as shown in FIG. 5).

FIG. 12 shows a stable management page that displays a list of horses running today. As shown in the stable navigation portion 1210, the words "Racing Today" are underlined, indicating the current page. The number "6" above the words "Racing Today" indicate that there are six of the user's stabled horses running in a race on the particular day ("Nov. 9, 2018"). For example, as shown in the horses running today portion 1220, "Hehasspirit" is running in Race 1 ("R1") at Ajax Downs. For details of the race, the user may click the corresponding "View Race" button. Unlike in the case of conventional systems for tracking horses, when a horse is placed in the user's stable the horse may by default remain in the stable for only a single subsequent race. This allows a user to adopt a strategy of applying the user's own inside knowledge about a horse. For example, upon watching a race, a user might note that a particular horse underperformed for some extenuating reason such as being blocked by other horses. The published statistics for the race often will not capture this particular information that was noticed by the user, resulting in statistics that cause the public at large to undervalue the horse in the next race. In such a situation, the user may place the horse in the user's stable, possibly along with some personal note 1224 about the horse (which may be added using a corresponding "NOTE" button in FIG. 5). In the next race, the user may then use his/her own inside information to strategically bet on the horse. In general, such strategy may only work for a single subsequent race. Once the next race is over, the statistics will likely reflect the horse more accurately, causing the user's inside information to lose its value. To reflect this, when a horse is placed in the user's stable, the horse may remain only for a single subsequent race by default. If the user would like to continue following a particular horse for one additional race, the user may click the "Follow past this race" button 1222, causing the horse to remain in the stable for one more race. The "Follow past this race" button 1222 may change (e.g. to a thumbs-up icon as shown) to reflect that the horse will be stabled past today's race.

In addition to how many stabled horses are scheduled to run today ("Racing Today"), the stable navigation portion 1210 may further indicate how many stabled horses are scheduled to run tomorrow ("Racing Tomorrow"). By clicking on the corresponding part of the stable navigation portion 1210, the user may navigate to a stable management page that displays a list of stabled horses whose next race is tomorrow. As shown in FIG. 13, such a page may include a list of horses in a horses running tomorrow portion 1230 similar to the horses running today portion 1220 of FIG. 12. The stable navigation portion 1210 may further indicate how many stabled horses are scheduled to run at all ("Entered Horses"), which may take the user to a page listing the combination of stabled horses whose next race is scheduled for today, stabled horses whose next race is scheduled for tomorrow, and stabled horses whose next race scheduled thereafter. For example, a horse that is scheduled to run one week in advance may first appear on the "Entered Horses" page one week in advance. The stable navigation portion 1210 may further indicate how many horses in total are in the user's stable ("Horses Following"), which may link to a page as shown in FIG. 14. Here, all horses in the user's stable may be displayed in a followed horses portion 1240 irrespective of whether they are yet scheduled. A user may remove a horse from the stable by clicking the "X" button under the word "Remove" corresponding to the horse.

The user's stable may also be used to follow horse trainers. An example of this is shown in FIG. 15, which shows a stable management page displaying a list of today's races in which a particular trainer ("TrainerName1") has horses running. It is contemplated that the list may include races scheduled for two days (i.e. today and tomorrow) rather than just today. The information about TrainerName1 shown in FIG. 15 may be accessed, for example, by searching for TrainerName1 using a search tool 1250, by clicking on a trainer's name associated with a horse (see, e.g., FIG. 14), or by clicking on a trainer's name from among the user's stabled trainers. A list of the user's stabled trainers may be accessed by clicking "Trainers" in the stable navigation portion 1210. Whereas the horses in a user's stable may by default remain in the stable only for a single subsequent race, the trainers may by default remain stabled indefinitely.

In the above examples of the horse race betting GUI 500, it is described that one or more tickets may be automatically generated based on the user's choices including which race(s), eliminations, bet type, bet amount, budget, absolute and multi-ticket singles, and other manual selections. However, the disclosure is not intended to be so limited. For example, it is contemplated that one or more of these user selections may instead be determined automatically by the horse race betting GUI 500 in producing the best ticket(s). A user may, for example, only input a particular date, track, and budget, with the horse race betting GUI 500 automatically determining which race(s), which bet type, etc. to include in one or more tickets to maximize a function of a predicted ticket win percentage within the user's budget. It is also contemplated that multiple levels of user involvement may be accommodated by the horse race betting GUI 500, depending on the user's preferences.

In the above examples, it is described that the one or more horses marked in response to a user interaction with the automatic ticket generation button 190, 540 may maximize a function of the predicted ticket win percentage 170 without causing a number of bets times the bet amount to exceed the maximum ticket price or budget. That is, the horse race betting apparatus 200 may look for the best ticket within the maximum ticket price (e.g. the user's budget or the user's budget divided among the number of tickets). However, the disclosure is not intended to be so limited. It is also contemplated, for example, that the automatically marked horses may minimize a function of ticket price or budget without causing the predicted ticket win percentage 170 to fall below a certain percentage (e.g. 5%). That is, the horse race betting apparatus 200 may look for the least expensive ticket(s) having a minimum threshold predicted ticket win percentage 170. In this case, the horse race betting GUI 100, 500 may include, in place of or in addition to the maximum ticket price selector 150 or budget selector 556, a minimum predicted ticket win percentage selector by which a user of the graphical user interface may select a minimum predicted ticket win percentage.

Throughout the above description of the horse race betting GUI 100, 500, reference is made to various means of user interaction, including clicking on various user interface elements. The disclosure is not intended to be limited to such specific interactions and any known user-device interactions may be applicable, including but not limited to keyboard, mouse, touch, gesture, voice, eye-tracking, etc. The various selectors, selectable elements, navigators, and buttons described in relation to FIGS. 1, 5-9, and 12-15 may be any kind of graphical user interface element that fulfills the described functions, for example, drop-down menus, list boxes, etc. for selection from a list (or alternatively blank input fields), and checkboxes, radio buttons, switches, etc. for elements to be marked, switched, toggled, etc.

Owing to the various combinations of features described throughout this disclosure, the disclosed horse race betting GUI 100, 500, horse race betting apparatus 200, and related embodiments may be regarded as an improvement to conventional computer-implemented horse race betting tools. Such conventional betting tools merely add the convenience of computer technology to the otherwise conventional paper-and-pencil process of manually choosing horses based on published information. In contrast, the disclosed embodiments represent an entirely unconventional approach to ticket generation by providing a graphical user interface that allows a user to automatically generate one or more optimal tickets within various constraints. The ticket(s) may be generated based on predicted win percentages 114, 514 of each horse as in the above examples. However, the disclosure is not intended to be so limited and various other features of horses (including features of the horses' trainers, jockeys, etc.) may be used in place of predicted win percentages 114, 514 throughout the disclosure including, for example, expected payout, return on investment (ROI), or any other feature that may be determined from available data associated with the horses, whether it is determined automatically based on an algorithm or manually by experts.

Figure 16:
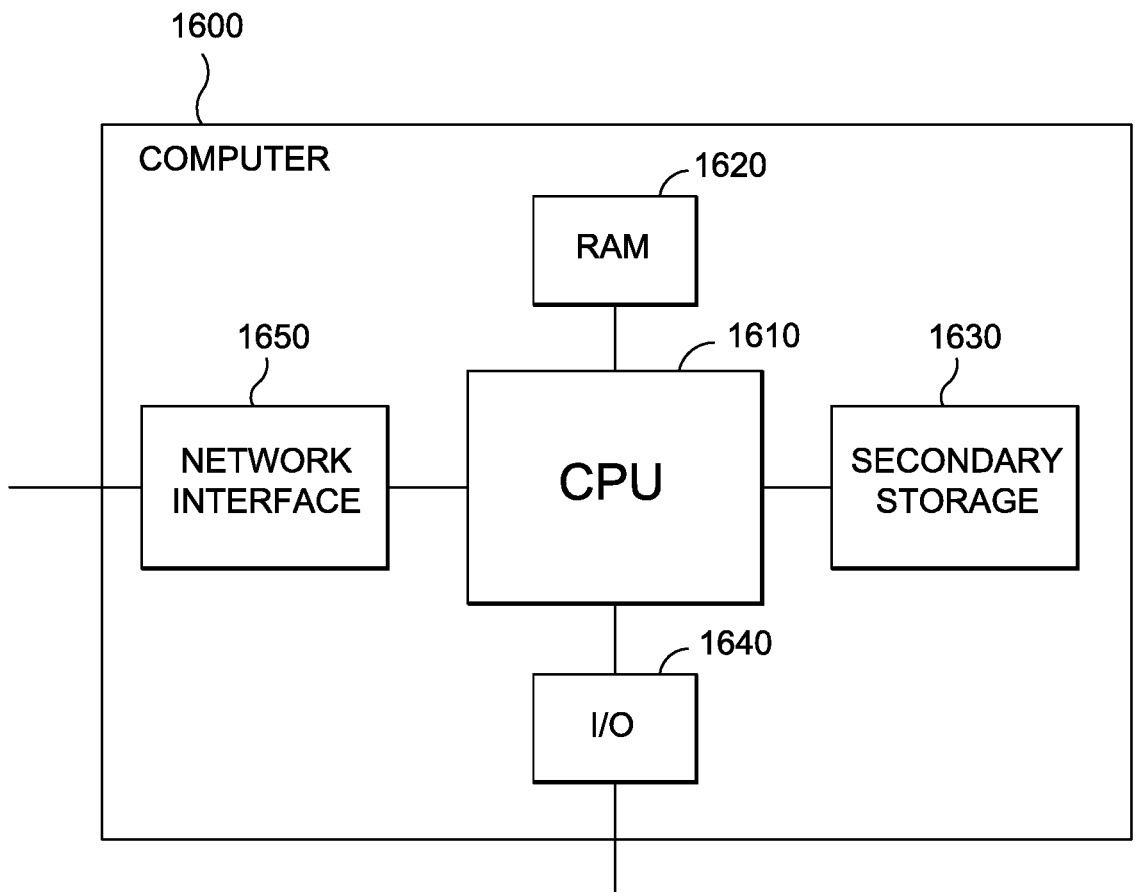
FIG. 16 shows an example of a computer in which the horse race betting apparatus of FIG. 2, the operational flows of FIGS. 3, 4, 10, and 11, and/or other embodiments of the disclosure may be wholly or partly embodied.

FIG. 16 shows an example of a computer 1600 in which the horse race betting apparatus 200 of FIG. 2, the operational flows of FIGS. 3, 4, 10, 11, and/or other embodiments of the disclosure may be wholly or partly embodied. As shown in FIG. 16, the computer 1600 may include a processor (e.g. a CPU) 1610, a system memory (e.g. RAM) 1620 that may be connected by a dedicated memory channel to the processor 1610 and temporarily stores results of data processing operations performed by the processor 1610, and a hard drive or other secondary storage device 1630. The processor 1610 may execute one or more computer programs, which may be tangibly embodied along with an operating system in a computer-readable medium, e.g., the secondary storage device 1630. The operating system and computer programs may be loaded from the secondary storage device 1630 into the system memory 1620 to be executed by the processor 1610. The computer 1600 may further include a network interface 1640 for network communication between the computer 1600 and external devices (e.g. over the Internet), such as user devices 300 accessing the horse race betting GUI 100, 500 described throughout this disclosure using a mobile application or web browser. Server-side user interaction with the computer 1600 may be via one or more I/O devices 1650, such as a display, mouse, keyboard, etc.

The computer programs may comprise program instructions which, when executed by the processor 1610, cause the processor 1610 to perform operations in accordance with the various embodiments of the present disclosure. For example, a program that is installed in the computer 1600 may cause the computer 1600 to function as an apparatus such as the horse race betting apparatus 200 of FIG. 2, e.g., causing the computer 1600 to function as some or all of the sections, components, elements, databases, engines, interfaces, modules, updaters, selectors, calculators, etc. of the apparatus 200 of FIG. 2 (e.g., the user I/O interface 210, the ticket updater 220, etc.). A program that is installed in the computer 1600 may also cause the computer 1600 to perform an operational flow such as those shown in FIGS. 3, 4, 10, and 11 or a portion thereof, e.g., causing the computer 1600 to perform one or more of the steps of FIG. 3 or 10 (e.g., display list(s) of horses 310, 1010, mark horse(s) based on predicted win percentages 380, 1080, etc.) and or FIG. 4 or 11 (e.g., apply lock selection constraint 410, 1110, maximize function of predicted ticket win percentage 430, 1140, etc.).

The above-mentioned computer programs may be provided to the secondary storage 1630 by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer 1600 via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor or programmable circuit to perform operations for generating a graphical user interface for horse race betting, the operations comprising:

displaying a first list of horses scheduled to run a first race from among a plurality of horses;

displaying, in association with each horse of the first list of horses, a win selection element by which a user of the graphical user interface may mark the horse as selected to win the first race;

displaying, adjacent to the first list of horses, a second list of horses scheduled to run a second race;

displaying, in association with each horse of the second list of horses, a win selection element by which a user of the graphical user interface may mark the horse as selected to win the second race;

displaying, adjacent to the second list of horses, a third list of horses scheduled to run a third race;

displaying, in association with each horse of the third list of horses, a win selection element by which a user of the graphical user interface may mark the horse as selected to win the third race;

displaying an automatic ticket generation button by which a user may request an automatic selection of horses; and, in response to a user interaction with the automatic ticket generation button, marking one or more horses of the first list of horses as selected to win the first race based on predicted win percentages of the horses of the first list, marking one or more horses of the second list of horses as selected to win the second race based on predicted win percentages of the horses of the second list, and marking one or more horses of the third list of horses as selected to win the third race based on predicted win percentages of the horses of the third list, wherein said marking one or more horses in response to a user interaction with the automatic ticket generation button is further based on constraints imposed by a bet amount and a maximum ticket price, wherein the one or more horses marked in response to a user interaction with the automatic ticket generation button maximizes a function of a predicted ticket win percentage without causing a number of bets times the bet amount to exceed the maximum ticket price, the predicted ticket win percentage being calculated from the predicted win percentages of the horses and representing a likelihood that, in each respective race, a horse will win from among the horses marked to win that respective race.

2. The non-transitory program storage medium of claim 1, wherein the operations further comprise:
displaying, in association with each horse of the first list of horses, the predicted win percentage of the horse.

3. The non-transitory program storage medium of claim 1, wherein the operations further comprise:
displaying, in association with each horse of the first, second, and third lists of horses, the predicted win percentage of the horse.

4. The non-transitory program storage medium of claim 1, wherein the operations further comprise:
displaying, in association with each horse of the first, second, and third lists of horses, a horse lock element by which a user of the graphical user interface may lock the horse's marked/unmarked status;
wherein said marking one or more horses in response to a user interaction with the automatic ticket generation button is further based on constraints imposed by a user interaction with the horse lock elements.

5. The non-transitory program storage medium of claim 1, wherein the operations further comprise:
displaying, in association with the first list of horses, a first leg lock element by which a user of the graphical user interface may lock marked/unmarked status of all horses of the first list of horses;
displaying, in association with the second list of horses, a second leg lock element by which a user of the graphical user interface may lock marked/unmarked status of all horses of the second list of horses;
displaying, in association with the third list of horses, a third leg lock element by which a user of the graphical user interface may lock marked/unmarked status of all horses of the third list of horses;
wherein said marking one or more horses in response to a user interaction with the automatic ticket generation button is further based on constraints imposed by a user interaction with the first, second, and third leg lock elements.

6. The non-transitory program storage medium of claim 1, wherein the operations further comprise:
displaying the predicted ticket win percentage based on the predicted win percentages of horses marked to win the first, second, and third races, the predicted ticket win percentage being a likelihood that any of the horses from among the horses marked to win the first race will win the first race, any of the horses from among the horses marked to win the second race will win the second race, and any of the horses from among the horses marked to win the third race will win the third race.

7. The non-transitory program storage medium of claim 1, wherein the operations further comprise:
displaying a maximum ticket price selector by which a user of the graphical user interface may select the maximum ticket price.

8. The non-transitory program storage medium of claim 1, wherein the one or more horses marked in response to a user interaction with the automatic ticket generation button maximizes the predicted ticket win percentage without causing a number of bets times the bet amount to exceed the maximum ticket price.

9. The non-transitory program storage medium of claim 1, wherein the operations further comprise:
displaying, adjacent to the third list of horses, a fourth list of horses scheduled to run a fourth race;
displaying, in association with each horse of the fourth list of horses, a win selection element by which a user of the graphical user interface may mark the horse as selected to win the fourth race; and,
in response to a user interaction with the automatic ticket generation button, further marking one or more horses of the fourth list of horses as selected to win the fourth race based on predicted win percentages of the horses of the fourth list.

10. The non-transitory program storage medium of claim 9, wherein the operations further comprise:
displaying the predicted ticket win percentage based on the predicted win percentages of horses marked to win the first, second, third, and fourth races, the predicted ticket win percentage being a likelihood that any of the horses marked to win the first race will win the first race, any of the horses marked to win the second race will win the second race, any of the horses marked to win the third race will win the third race, and any of the horses marked to win the fourth race will win the fourth race.

11. The non-transitory program storage medium of claim 9, wherein the operations further comprise:
displaying, adjacent to the fourth list of horses, a fifth list of horses scheduled to run a fifth race;
displaying, in association with each horse of the fifth list of horses, a win selection element by which a user of the graphical user interface may mark the horse as selected to win the fifth race; and,
in response to a user interaction with the automatic ticket generation button, further marking one or more horses of the fifth list of horses as selected to win the fifth race based on predicted win percentages of the horses of the fifth list.

12. The non-transitory program storage medium of claim 11, wherein the operations further comprise:
displaying the predicted ticket win percentage based on the predicted win percentages of horses marked to win the first, second, third, fourth, and fifth races, the predicted ticket win percentage being a likelihood that any of the horses marked to win the first race will win the first race, any of the horses marked to win the second race will win the second race, any of the horses marked to win the third race will win the third race, any of the horses marked to win the fourth race will win the fourth race, and any of the horses marked to win the fifth race will win the fifth race.

13. The non-transitory program storage medium of claim 11, wherein the operations further comprise:
displaying, adjacent to the fifth list of horses, a sixth list of horses scheduled to run a sixth race;
displaying, in association with each horse of the sixth list of horses, a win selection element by which a user of the graphical user interface may mark the horse as selected to win the sixth race; and,
in response to a user interaction with the automatic ticket generation button, further marking one or more horses of the sixth list of horses as selected to win the sixth race based on predicted win percentages of the horses of the sixth list.

14. The non-transitory program storage medium of claim 13, wherein the operations further comprise:
displaying the predicted ticket win percentage based on the predicted win percentages of horses marked to win the first, second, third, fourth, fifth, and sixth races, the predicted ticket win percentage being a likelihood that any of the horses marked to win the first race will win the first race, any of the horses marked to win the second race will win the second race, any of the horses marked to win the third race will win the third race, any of the horses marked to win the fourth race will win the fourth race, any of the horses marked to win the fifth race will win the fifth race, and any of the horses marked to win the sixth race will win the sixth race.

15. The non-transitory program storage medium of claim 1, wherein the operations further comprise:
   displaying, in association with each horse of the first list of horses, a second place selection element by which a user of the graphical user interface may mark the horse as selected to finish in second place in the race;
   displaying, in association with each horse of the first list of horses, a third place selection element by which a user of the graphical user interface may mark the horse as selected to finish in third place in the race; and,
   in response to a user interaction with the automatic ticket generation button, further marking one or more horses of the first list of horses as selected to finish in second or third place in the first race based on predicted win percentages of the horses of the first list.

16. A method of generating a graphical user interface for horse race betting, the method comprising:
   displaying a first list of horses scheduled to run a first race from among a plurality of horses;
   displaying, in association with each horse of the first list of horses, a win selection element by which a user of the graphical user interface may mark the horse as selected to win the first race;
   displaying, adjacent to the first list of horses, a second list of horses scheduled to run a second race;
   displaying, in association with each horse of the second list of horses, a win selection element by which a user of the graphical user interface may mark the horse as selected to win the second race;
   displaying, adjacent to the second list of horses, a third list of horses scheduled to run a third race;
   displaying, in association with each horse of the third list of horses, a win selection element by which a user of the graphical user interface may mark the horse as selected to win the third race;
   displaying an automatic ticket generation button by which a user may request an automatic selection of horses; and,
   in response to a user interaction with the automatic ticket generation button, marking one or more horses of the first list of horses as selected to win the first race based on predicted win percentages of the horses of the first list, marking one or more horses of the second list of horses as selected to win the second race based on predicted win percentages of the horses of the second list, and marking one or more horses of the third list of horses as selected to win the third race based on predicted win percentages of the horses of the third list,
   wherein said marking one or more horses in response to a user interaction with the automatic ticket generation button is further based on constraints imposed by a bet amount and a maximum ticket price,
   wherein the one or more horses marked in response to a user interaction with the automatic ticket generation button maximizes a function of a predicted ticket win percentage without causing a number of bets times the bet amount to exceed the maximum ticket price, the predicted ticket win percentage being calculated from the predicted win percentages of the horses and representing a likelihood that, in each respective race, a horse will win from among the horses marked to win that respective race.

17. A system for generating a graphical user interface for horse race betting, the system comprising:
   a server in communication with a user device; and
   a program storage medium on which are stored instructions executable by the server to perform operations for generating a graphical user interface accessible by the user device via a web browser or mobile application of the user device, the operations comprising:
      displaying a first list of horses scheduled to run a first race from among a plurality of horses;
      displaying, in association with each horse of the first list of horses, a win selection element by which a user of the graphical user interface may mark the horse as selected to win the first race;
      displaying, adjacent to the first list of horses, a second list of horses scheduled to run a second race;
      displaying, in association with each horse of the second list of horses, a win selection element by which a user of the graphical user interface may mark the horse as selected to win the second race;
      displaying, adjacent to the second list of horses, a third list of horses scheduled to run a third race;
      displaying, in association with each horse of the third list of horses, a win selection element by which a user of the graphical user interface may mark the horse as selected to win the third race;
      displaying an automatic ticket generation button by which a user may request an automatic selection of horses; and,
      in response to a user interaction with the automatic ticket generation button, marking one or more horses of the first list of horses as selected to win the first race based on predicted win percentages of the horses of the first list, marking one or more horses of the second list of horses as selected to win the second race based on predicted win percentages of the horses of the second list, and marking one or more horses of the third list of horses as selected to win the third race based on predicted win percentages of the horses of the third list,
      wherein said marking one or more horses in response to a user interaction with the automatic ticket generation button is further based on constraints imposed by a bet amount and a maximum ticket price,
      wherein the one or more horses marked in response to a user interaction with the automatic ticket generation button maximizes a function of a predicted ticket win percentage without causing a number of bets times the bet amount to exceed the maximum ticket price, the predicted ticket win percentage being calculated from the predicted win percentages of the horses and representing a likelihood that, in each respective race, a horse will win from among the horses marked to win that respective race.

18. A non-transitory program storage medium on which are stored instructions executable by a processor or programmable circuit to perform operations for generating a graphical user interface for horse race betting, the operations comprising:
   displaying a first list of horses scheduled to run a first race from among a plurality of horses;
   displaying, in association with each horse of the first list of horses, one or more eliminator elements by which a user of the graphical user interface may mark the horse as eliminated from consideration with respect to the first race;

displaying an automatic ticket generation button by which a user may request an automatic selection of horses; and, in response to a user interaction with the automatic ticket generation button, marking one or more horses of the first list of horses as selected to win the first race based on predicted win percentages of the horses of the first list and constraints imposed by a user interaction with the eliminator elements, wherein the one or more eliminator elements associated with each horse of the first list of horses includes a first place eliminator element by which the user of the graphical user interface may mark the horse as eliminated from consideration for coming in first place in the first race while not being eliminated from consideration for coming in second or third place in the first race, wherein the one or more horses marked in response to a user interaction with the automatic ticket generation button maximizes a function of a predicted ticket win percentage without causing a number of bets times a bet amount to exceed a maximum ticket price, the predicted ticket win percentage being calculated from the predicted win percentages of the horses and representing a likelihood that, in each respective race, a horse will win from among the horses marked to win that respective race.

19. The non-transitory program storage medium of claim 18, wherein the one or more eliminator elements associated with each horse of the first list of horses includes a race eliminator element by which the user of the graphical user interface may mark the horse as eliminated from consideration for coming in first place in the first race, eliminated from consideration for coming in second place in the first race, and eliminated from consideration for coming in third place in the first race.

20. The non-transitory program storage medium of claim 18, wherein the one or more eliminator elements associated with each horse of the first list of horses further includes a second place eliminator element by which the user of the graphical user interface may mark the horse as eliminated from consideration for coming in second place in the first race while not being eliminated from consideration for coming in first or third place in the first race.

21. The non-transitory program storage medium of claim 20, wherein the one or more eliminator elements associated with each horse of the first list of horses further includes a third place eliminator element by which the user of the graphical user interface may mark the horse as eliminated from consideration for coming in third place in the first race while not being eliminated from consideration for coming in first or second place in the first race.

22. The non-transitory storage medium of claim 18, further comprising:

displaying, in association with each horse of the first list of horses, one or more single selection elements by which a user of the graphical user interface may mark the horse as singled with respect to the first race;

wherein said marking one or more horses in response to a user interaction with the automatic ticket generation button is further based on constraints imposed by a user interaction with the one or more single selection elements.

23. A non-transitory program storage medium on which are stored instructions executable by a processor or programmable circuit to perform operations for generating a graphical user interface for horse race betting, the operations comprising:

displaying a first list of horses scheduled to run a first race from among a plurality of horses;

displaying, in association with each horse of the first list of horses, a win selection element by which a user of the graphical user interface may mark the horse as selected to win the first race;

displaying, adjacent to the first list of horses, a second list of horses scheduled to run a second race;

displaying, in association with each horse of the second list of horses, a win selection element by which a user of the graphical user interface may mark the horse as selected to win the second race;

displaying, adjacent to the second list of horses, a third list of horses scheduled to run a third race;

displaying, in association with each horse of the third list of horses, a win selection element by which a user of the graphical user interface may mark the horse as selected to win the third race;

displaying, in association with each of a plurality of sets of at least one horse of the first, second, and third lists of horses, a lock element by which a user of the graphical user interface may lock the marked/unmarked status of the at least one horse;

displaying an automatic ticket generation button by which a user may request an automatic selection of horses; and, in response to a user interaction with the automatic ticket generation button, marking one or more horses of the first list of horses as selected to win the first race based on predicted win percentages of the horses of the first list, marking one or more horses of the second list of horses as selected to win the second race based on predicted win percentages of the horses of the second list, and marking one or more horses of the third list of horses as selected to win the third race based on predicted win percentages of the horses of the third list, wherein said marking one or more horses in response to a user interaction with the automatic ticket generation button is further based on constraints imposed by a user interaction with the lock elements, wherein the one or more horses marked in response to a user interaction with the automatic ticket generation button maximizes a function of a predicted ticket win percentage without causing a number of bets times a bet amount to exceed a maximum ticket price, the predicted ticket win percentage being calculated from the predicted win percentages of the horses and representing a likelihood that, in each respective race, a horse will win from among the horses marked to win that respective race.

24. The non-transitory program storage medium of claim 23, wherein the lock elements include horse lock elements, displayed in association with each horse of the first, second, and third lists of horses, by which a user of the graphical user interface may lock the horse's marked/unmarked status.

25. The non-transitory program storage medium of claim 23, wherein the lock elements include a first leg lock element, displayed in association with the first list of horses, by which a user of the graphical user interface may lock marked/unmarked status of all horses of the first list of horses, a second leg lock element, displayed in association with the second list of horses, by which a user of the graphical user interface may lock marked/unmarked status of all horses of the second list of horses, and a third leg lock element, displayed in association with the third list of horses, by which a user of the graphical user interface may lock marked/unmarked status of all horses of the third list of horses.

* * * * *